United States Patent
Kojima et al.

(10) Patent No.: US 11,287,793 B2
(45) Date of Patent: Mar. 29, 2022

(54) CONTROL DEVICE, CONTROL METHOD FOR CONTROL DEVICE, INFORMATION PROCESSING PROGRAM, AND RECORDING MEDIUM

(71) Applicant: OMRON Corporation, Kyoto (JP)

(72) Inventors: Tatsuya Kojima, Kyoto (JP); Takahiro Toku, Kusatsu (JP)

(73) Assignee: OMRON Corporation, Kyoto (JP)

( * ) Notice: Subject to any disclaimer, the term of this patent is extended or adjusted under 35 U.S.C. 154(b) by 150 days.

(21) Appl. No.: 16/641,796

(22) PCT Filed: Oct. 5, 2018

(86) PCT No.: PCT/JP2018/037462
§ 371 (c)(1),
(2) Date: Feb. 25, 2020

(87) PCT Pub. No.: WO2019/082627
PCT Pub. Date: May 2, 2019

(65) Prior Publication Data
US 2020/0264578 A1 Aug. 20, 2020

(30) Foreign Application Priority Data
Oct. 24, 2017 (JP) .............................. JP2017-205426

(51) Int. Cl.
*G05B 19/05* (2006.01)
*G05B 19/042* (2006.01)
(52) U.S. Cl.
CPC ....... *G05B 19/056* (2013.01); *G05B 19/0421* (2013.01); *G05B 19/054* (2013.01)

(58) Field of Classification Search
CPC .............. G05B 19/056; G05B 19/0421; G05B 19/054; G05B 2219/1214; G05B 2219/1204; G05B 2219/1211
See application file for complete search history.

(56) References Cited

U.S. PATENT DOCUMENTS

2005/0091410 A1 * 4/2005 Gibart ...................... G05B 9/03
709/248
2014/0058538 A1 * 2/2014 Yaoita ................... G06F 11/323
700/28

FOREIGN PATENT DOCUMENTS

EP 2687931 A1 1/2014
EP 3101497 A1 12/2016
(Continued)

OTHER PUBLICATIONS

Jean Pille, Method and Industrial Control Calling a Function of a Control Program by Means of an OPC UA Call, Dec. 18, 2015, ESPACENET Original and Translation (Year: 2015).*

(Continued)

*Primary Examiner* — Rocio Del Mar Perez-Velez
*Assistant Examiner* — Christopher W Carter
(74) *Attorney, Agent, or Firm* — Metrolex IP Law Group, PLLC

(57) ABSTRACT

To read respective values as updated of a plurality of variables synchronization of which respective values is ensured while tasks are being carried out in a multi-tasking manner, a PLC 10 reads respective values as updated of variables A to C in such a manner as to complete reading the respective values as updated of the variables A to C during a time period from (i) a time point of a start of a single instance of a cycle of a task which cycle is shortest to (ii) a time point of an end of the single instance of the cycle.

8 Claims, 10 Drawing Sheets

(56) References Cited

FOREIGN PATENT DOCUMENTS

| JP | 2006-99258 A | 4/2006 |
| JP | 2009-181443 A | 8/2009 |
| JP | 2009-245009 A | 10/2009 |
| JP | 2017-84143 A | 5/2017 |

OTHER PUBLICATIONS

An English translation of the International Search Report("ISR") of PCT/JP2018/037462 dated Dec. 4, 2018.
The Written Opinion ("WO") of PCT/JP2018/037462 dated Dec. 4, 2018.
An extended European search report (EESR) dated Jun. 14, 2021 in a counterpart European patent application.

* cited by examiner

| Variable | Type | Task |
|---|---|---|
| A | Int | Primary fixed cycle Tp |
| B | Int | Primary fixed cycle Tp |
| C | Long | Fixed cycle Ts |

(B-1)

| Variable | Type | Task |
|---|---|---|
| A | Int | Primary fixed cycle Tp |
| B | Int | Primary fixed cycle Tp |
| C | Long | Primary fixed cycle Tp |
| | | Fixed cycle Ts |

(B-2)

| Variable | Type | Task |
|---|---|---|
| A | Int | Primary fixed cycle Tp |
| B | Int | Primary fixed cycle Tp |
| C | Long | Unknown |

CONTROL DEVICE, CONTROL METHOD FOR CONTROL DEVICE, INFORMATION PROCESSING PROGRAM, AND RECORDING MEDIUM

TECHNICAL FIELD

The present invention relates to a control device for use to control how a machine, a facility, or the like operates.

BACKGROUND ART

There have been known various efforts in producing an industrial control device such as a programmable logic controller (hereinafter abbreviated as "PLC") that computerized (specifically, that is designed to, for instance, allow an external device to use information that the industrial control device has obtained or generated) and that has a high performance at the same time.

Patent Literature 1 cited below, for example, discloses a technique of allowing a PLC, for example, as a server device and a client device to connect to each other in conformity to OPC Unified Architecture (OPC UA), which is a machine-to-machine communication protocol for industrial applications, in an effort to produce a computerized PLC.

Patent Literature 2 discloses a PLC configured to carry out processes in a multi-tasking manner, that is, to carry out a plurality of tasks concurrently in a time-sharing manner and carry out each task over a period corresponding to the task, in an effort to produce a high-performance PLC.

CITATION LIST

Patent Literature

[Patent Literature 1]
Japanese Patent Application Publication, Tokukai, No. 2017-84143 (Publication date: May 18, 2017)
[Patent Literature 2]
Japanese Patent Application Publication, Tokukai, No. 2009-181443 (Publication date: Aug. 13, 2009)

SUMMARY OF INVENTION

Technical Problem

There is a demand for a PLC such as that disclosed in Patent Literature 2 to determine a value as updated of each of a plurality of variables that have been updated substantially simultaneously for each of a plurality of tasks carried out concurrently, that is, to determine a value as updated of each of a plurality of variables with ensured synchronization.

The conventional technique of Patent Literature 1, however, involves the following issue: In a case where an industrial control device for carrying out a plurality of tasks concurrently and periodically has been queried collectively about respective values as updated of a plurality of variables while the industrial control device is carrying out tasks, synchronization is not ensured of the respective values of the plurality of variables in a response. In other words, the above conventional technique involves the following issue: An industrial control device for carrying out a plurality of tasks concurrently and periodically fails to control when to read respective values as updated of a plurality of variables each of which becomes updated in at least one task.

An aspect of the present invention has the following object: In a case where an industrial control device for carrying out a plurality of tasks concurrently and periodically has been collectively queried about respective values as updated of a plurality of variables while the industrial control device is carrying out tasks, synchronization is ensured of respective values as updated of the plurality of variables which respective values the industrial control device returns as a response.

Solution to Problem

In order to attain the above object, a control device in accordance with an aspect of the present invention is a control device configured to control control-target equipment by concurrently repeating a plurality of tasks each over a corresponding cycle, the control device including: an accepting section configured to accept from outside a request to collectively query about respective values that a plurality of variables have while the plurality of tasks are being carried out, the plurality of variables each having a value that becomes updated for at least one of the plurality of tasks; a reading section configured to, in a case where the accepting section has accepted the request, read the respective values of the plurality of variables, the respective values each having been updated for the at least one of the plurality of tasks, in such a manner that the reading section completes reading all the respective values of the plurality of variables during a time period from (i) a time point of a start of a single instance of a cycle of a task which cycle is shortest among respective cycles of the plurality of tasks to (ii) a time point of an end of the single instance of the cycle; and an output section configured to output, to outside, the respective values of the plurality of variables, the respective values having been read by the reading section.

In order to attain the above object, a control method in accordance with an aspect of the present invention is a method for controlling a control device configured to control control-target equipment by concurrently repeating a plurality of tasks each over a corresponding cycle, the method including: an accepting step of accepting from outside a request to collectively query about respective values that a plurality of variables have while the plurality of tasks are being carried out, the plurality of variables each having a value that becomes updated for at least one of the plurality of tasks; a reading step of, in a case where the request has been accepted during the accepting step, reading the respective values of the plurality of variables, the respective values each having been updated for the at least one of the plurality of tasks, in such a manner that reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle; and an output step of outputting, to outside, the respective values of the plurality of variables, the respective values having been read during the reading step.

Advantageous Effects of Invention

An aspect of the present invention has the following effect: In a case where an industrial control device for carrying out a plurality of tasks concurrently and periodically has been collectively queried about respective values as updated of a plurality of variables while the industrial control device is carrying out tasks, synchronization is ensured of respective values as updated of the plurality of variables which respective values the industrial control device returns as a response.

BRIEF DESCRIPTION OF DRAWINGS

FIG. 6 provides diagrams each illustrating a data structure of a variables management table stored in a storage section of the CPU unit of FIG. 5.

DESCRIPTION OF EMBODIMENTS

Embodiment 1

Figure 1:
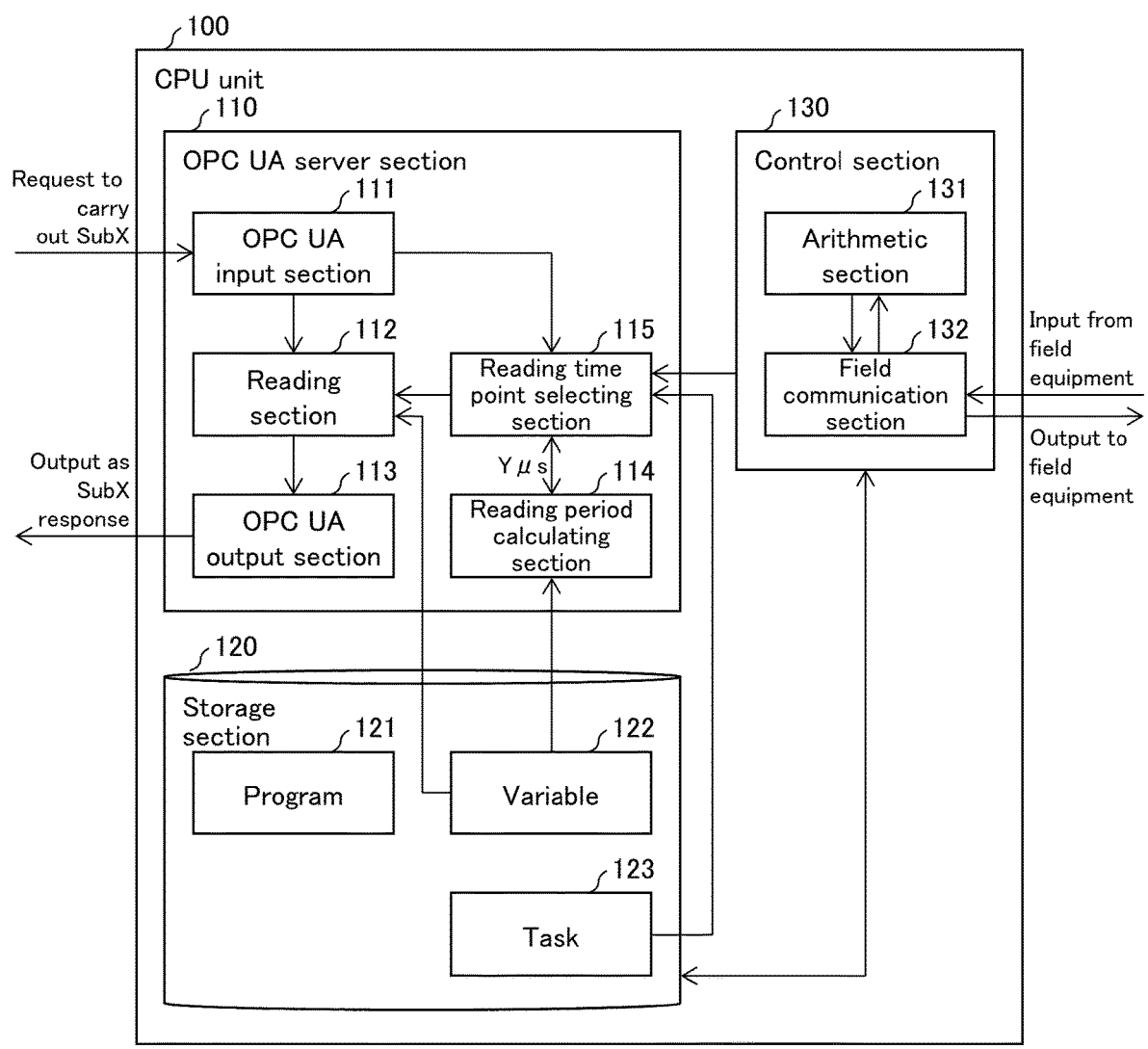
FIG. 1 is a block diagram illustrating, for example, the configuration of a main part of a CPU unit in accordance with Embodiment 1 of the present invention.

The description below deals with an embodiment in accordance with an aspect of the present invention (hereinafter referred to also as "present embodiment") with reference to drawings. The description below first deals with Embodiment 1 of the present invention in detail with reference to FIGS. 1 to 4. Identical or equivalent elements in the drawings are assigned an identical reference sign, and are not described repeatedly. The description of the present embodiment deals with, as a typical example of the control device, a programmable logic controller (PLC) for controlling a control target such as a machine and a facility.

§ 1. Example Application

For easier understanding of a PLC 10 (control device) in accordance with an aspect of the present invention, the description below first deals with an example case of how the present invention is applicable, specifically an outline of a management system 1 including a PLC 10, with reference to FIG. 2.

Figure 2:
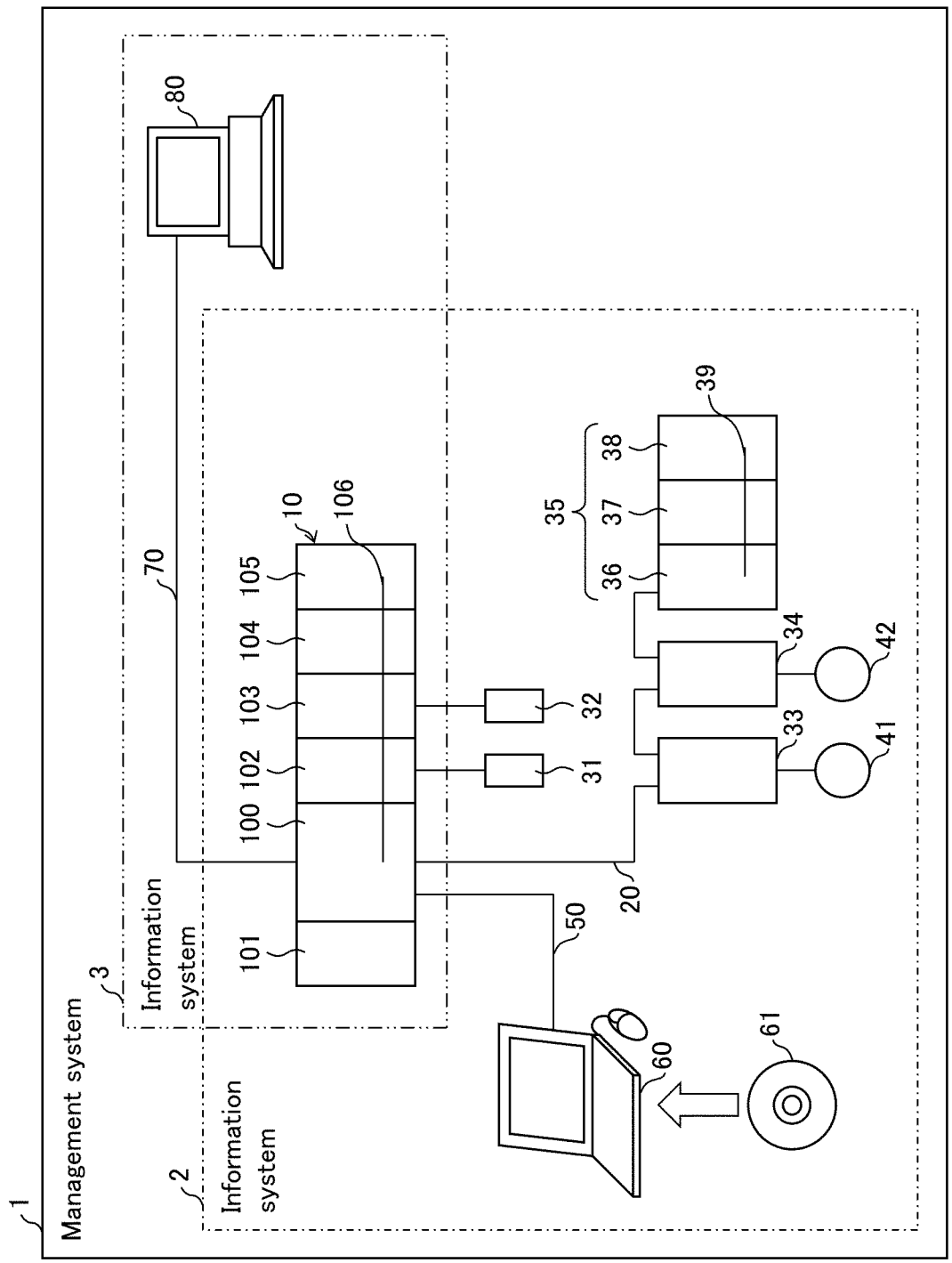
FIG. 2 is a diagram that outlines a management system in its entirety including a PLC including the CPU unit of FIG. 1.

FIG. 2 is a diagram that outlines a management system 1 in its entirety. The management system 1 includes two systems: a control system 2 including one or more PLCs 10 configured to control input equipment and output equipment inside a production facility, and an information system 3 configured to, for example, accumulate and analyze various items of information obtained or generated by the control system 2 and use the information for, for example, operation of the control system 2.

The PLC 10 is connected to both the control system 2 and the information system 3 to allow the information system 3 to access the control system 2 (in particular, data (variables) used in the control system 2). The PLC 10 is connected to a client device 80 with use of, for example, an OPC UA protocol.

The client device 80 of the information system 3 is configured to query the PLC 10 collectively about respective values as updated of a plurality of variables that the PLC 10 uses in carrying out a control process which respective values are values during operation of the PLC 10 and synchronization of which respective values is ensured. In other words, the client device 80 is configured to, for the purpose of, for example, determining how a plurality of variables are related to each other, query the PLC 10 collectively about respective values as updated substantially simultaneously of a plurality of variables whose respective values are updated when the PLC 10 carries out a control process. The client device 80, for instance, queries the PLC collectively about respective values as updated substantially simultaneously of variables A, B, and C (hereinafter abbreviated as "variables A to C").

A control device configured to repeat only one task will be able to ensure synchronization of respective readout values as updated of a plurality of variables each of which is updated for the task, by reading all the respective values at the end (or start) of a cycle of the task.

For the control system 2, however, the PLC 10 is required to carry out control strictly in real time. The PLC 10, to meet the requirement, carries out processes in a multi-tasking manner. In a case where processes are carried out in a multi-tasking manner, synchronization cannot be ensured of respective readout values of a plurality of variables by merely reading, at the end (or start) of a cycle of each task, respective values of variables which respective values have been updated for the task. For instance, in a case where a task Tp for which variables A and B are updated and a task Ts for which a variable C is updated are carried out concurrently, merely reading, at the end (or start) of a cycle of each task, respective values of the variables which respective values have been updated for the tasks may result in the situation below.

The task Tp may have been carried out more than once during a time period from (i) a time point at which reading of the respective values as updated of the variables A and B became completed (for instance, at the end of a first cycle of the task Tp) to (ii) a time point at which reading of the variable C became completed (for instance, at the end of a first cycle of the task Ts).

The PLC 10 prevents such a situation: It is configured to (i) read respective values as updated of a plurality of variables while ensuring synchronization of the respective readout values as updated of the plurality of variables and (ii) output the readout values to the client device 80.

The PLC 10 is, in other words, configured to read respective values as updated of a plurality of variables in such a manner that reading of each of the respective values of the plurality of variables becomes completed within the cycle of that one of a plurality of tasks which has the shortest cycle. The PLC 10, for instance, carries out reading in such a manner that neither of the tasks Tp and Ts is carried out even once during a time period from (i) a time point at which reading of respective values of the variables A and B which respective values have been updated for the task Tp becomes completed to (ii) a time point at which reading of a value of the variable C which value has been updated for the task Ts becomes completed. The PLC 10 then outputs, to the client device 80, the respective readout values as updated of the plurality of variables.

The above arrangement allows the client device 80 to collectively obtain from the PLC 10 respective values as updated of a plurality of variables synchronization of which respective values is ensured (that is, which respective values were updated substantially simultaneously). In other words, the management system 1 is arranged such that the information system 3 is capable of collectively determining respective values as updated of a plurality of variables used in the control system 2 synchronization of which respective values is ensured.

Synchronization being ensured of a plurality of readout values means that for instance, neither of variables P and Q was updated during a time period from (i) a time point at which reading of a value P1 as updated of the variable P became completed to (ii) a time point at which reading of a value Q1 as updated of the variable Q became completed. Thus, synchronization is described as being ensured of respective readout values as updated of the variables P and Q in a case where during a time period from completion of reading of P1 to completion of reading of Q1, the value of the variable P was not updated to P2, or the value of the variable Q was not updated to Q2.

Carrying out processes in a multi-tasking manner means carrying out a plurality of tasks concurrently. Specifically, carrying out processes in a multi-tasking manner can mean carrying out a plurality of tasks simultaneously and concurrently or carrying out a plurality of tasks concurrently in a time-sharing manner. The description below deals with a case of the PLC 10 carrying out a plurality of tasks concurrently in a time-sharing manner. The PLC 10 is configured to, even in the case of carrying out a plurality of tasks simultaneously and concurrently, collectively read respective values as updated of a plurality of variables synchronization of which respective values is ensured.

In a case where the PLC 10, for instance, includes a single core and is configured for "concurrent carrying-out", that is, configured to, when carrying out a task, carry out no other task for multi-tasking, the PLC 10 collectively reads respective values as updated of a plurality of variables synchronization of which respective values is ensured. In a case where the PLC 10, for instance, includes a multi-core and is configured for "parallel carrying-out", that is, configured to, when carrying out a task, carry out another task for multi-tasking, the PLC 10 collectively reads respective values as updated of a plurality of variables synchronization of which respective values is ensured. In other words, regardless of whether the PLC 10 is configured for concurrent carrying-out or parallel carrying-out for multi-tasking, the PLC 10 collectively reads respective values as updated of a plurality of variables synchronization of which respective values is ensured. The PLC 10 concurrently repeating a plurality of tasks each over a corresponding period can mean a case of concurrent carrying-out or a case of parallel carrying-out.

§ 2. Example Configuration (Outline of Control System)

The control system 2 includes a PLC 10, servo drivers 33 and 34 and a remote IO terminal 35 each connected to the PLC 10 over a field network 20, and devices 31 and 32 as field equipment. The PLC 10 is connected to a support device 60 via a connection cable 50. The control system 2 is arranged such that one or more PLCs 10, each of which is responsible for controlling input equipment and output equipment inside a production facility, and equipment whose operation is controlled by each PLC 10 are connected to a control network such as the field network 20. The PLC 10 and the equipment communicate cyclically with each other over the control network for transmission of IN data and OUT data (hereinafter referred to as "IO data") to control the production facility.

The PLC 10 is a control device for controlling a control target such as a machine and a facility in the control system 2. The PLC 10 is a master device that manages data transmission over the field network 20 in the control system 2. The PLC 10 includes a CPU unit 100 configured to carry out main arithmetic processes, an electric power source unit 101, one or more IO units (in the example illustrated in FIG. 2, IO units 102 to 104), and a special unit 105. The CPU unit 100, each of the IO units 102 to 104, and the special unit 105 are capable of transmitting and receiving data to and from each other over a PLC system bus 106.

The CPU unit 100 is configured to carry out various processes related to, for example, the state of a control target. The CPU unit 100, for instance, carries out a process of controlling a control target by repeating (i) transmission of output data, (ii) reception of input data, and (iii) execution of a control program for generating output data with use of the input data. The CPU unit 100 will be described later in detail with reference to FIG. 1.

The electric power source unit 101 is configured to supply electric power with an appropriate voltage to the CPU unit 100, the IO units 102 to 104, and the special unit 105.

The IO units 102 to 104 are each a unit for a general input-output process. The IO units 102 to 104 are each responsible for input-output of data indicative of the ON/OFF state (that is, binarized data). Specifically, the IO units 102 to 104 are each configured to collect information on whether the device 31 as input equipment such as a sensor has detected a target (ON) or has not detected a target (OFF). The IO units 102 to 104 are each configured to output, to the device 32 as output equipment such as a relay or an actuator, a command for activation (ON) or a command for deactivation (OFF).

The special unit 105 has functions that are not supported by the IO units 102 to 104 such as (i) input-output of data different from data that the IO units 102 to 104 process (for example, analog data), (ii) temperature control, and (iii) communication based on a particular communication mode.

The devices 31 and 32 are each input-output equipment controlled by the PLC 10. Examples of the device 31 as input equipment include a detector such as a temperature sensor or optical sensor and a switch (such as a push-button switch, a limit switch, and a pressure switch). Examples of the device 32 as output equipment include an actuator, a relay, a solenoid valve, an indicator, and an indicator lamp.

The field network 20 is used to transmit various pieces of data between the CPU unit 100 and field equipment (namely, the servo drivers 33 and 34 and the remote IO terminal 35). The field network 20 is typically based on any of various industrial Ethernets (registered trademark). Known example industrial Ethernets (registered trademark) include EtherCAT (registered trademark), Profinet IRT, MECHATROLINK (registered trademark)-III, Powerlink, SERCOS (registered trademark)-III, and CIP Motion, any of which can be used. The field network 20 may be a field network other than an industrial Ethernet (registered trademark). The field network 20 may be, for example, DeviceNet or CompoNet/IP (registered trademark) in a case where the PLC 10 does not carry out motion control. The field network 20 of the control system 2 is, as a typical example, based on EtherCAT (registered trademark), which is an industrial Ethernet (registered trademark).

The PLC 10 may alternatively be configured such that the CPU unit 100 controls a control target directly as long as it is sufficient for the CPU unit 100 to have, as built-in functions, the respective functions of the IO units 102 to 104 and the servo drivers 33 and 34.

The servo drivers 33 and 34 are each connected to the CPU unit 100 over the field network 20, and are configured to drive the respective servomotors 41 and 42 each in accordance with a command value from the CPU unit 100.

More specifically, the servo drivers 33 and 34 each receive, from the PLC 10, a command value such as a position command value, a speed command value, and a torque command value repeatedly at fixed time intervals (that is, periodically). The servo drivers 33 and 34 obtain, from various detectors (device 31) connected to the servomotors 41 and 42, various detection values (actual measured values) related to operation of the servomotors 41 and 42. For instance, the servo drivers 33 and 34 obtain, from a detector such as a position sensor (rotary encoder) and a torque sensor connected to each of the respective shafts of the servomotors 41 and 42, actual measured values of, for example, the position, speed, and torque related to operation of the servomotors 41 and 42. An actual measured value of the speed may be calculated from the difference between the current position and the immediately previous position.

The servo drivers 33 and 34 then each set the command value from the CPU unit 100 to a target value, and carry out feedback control with use of an actual measured value as a feedback value. In other words, the servo drivers 33 and 34 adjust respective electric currents for driving the respective servomotors 41 and 42 so that the actual measured value becomes closer to the target value. The servo drivers 33 and 34 may each be referred to as a servomotor amplifier as well.

FIG. 2 illustrates an example system that combines servomotors 41 and 42 with servo drivers 33 and 34. The information system 2 may alternatively be, for example, a system that combines a pulse motor with a pulse motor driver.

The remote IO terminal 35 is basically similar to the IO units 102 to 104, and is configured to carry out a process related to a general input-output process. More specifically, the remote IO terminal 35 includes (i) a communication coupler 36 for carrying out a process related to data transmission over the field network 20 and (ii) one or more IO units (in the example illustrated in FIG. 2, IO units 37 and 38). The communication coupler 36 and the IO units 37 and 38 are capable of transmitting and receiving data to and from each other over a remote IO terminal bus 39.

The support device 60 is an information processing device capable of connecting to the PLC 10. The support device 60 is connected to the PLC 10 via a connection cable 50 as, for example, a USB (universal serial bus) cable. The support device 60 carries out a process for the PLC 10 for setting various parameters, programming, monitoring, debugging, and/or the like.

Various programs executed on the support device 60 may be stored on a CD-ROM 61 for distribution. A program stored on the CD-ROM 61 may be read by a CD-ROM (compact disk-read only memory) drive of the support device 60 onto, for example, a hard disc drive (HDD) of the support device 60 for storage. The support device 60 may alternatively download a program to be executed on the support device 60 from, for example, a higher level host computer over a network.

The support device 60 is, for example, a personal computer, and carries out a process of writing and/or editing a user program to be executed on the PLC 10. The support device 60 carries out a process of downloading a user program from the PLC 10 and a process of uploading a user program to the PLC 10.

The user can use the support device 60 to set a task, which is an execution unit of a program on the PLC 10 (in particular, the CPU unit 100). The PLC 10 (in particular, a control section 130 of the CPU unit 100) is configured to control a control target by carrying out a task. A task includes carrying out, for example, a user program for controlling a control target. A user program is a control program for controlling control-target equipment. The user can use the support device 60 to define various settings related to, for example, (i) the cycle and timing of carrying out a task, (ii) a program to be executed for the task, (iii) input-output refresh to be performed for the task, and (iv) a variable to be shared by different tasks (for example, a global variable). The support device 60 notifies (that is, uploads to) the PLC 10 of the above various settings defined by the user.

(Outline of Information System)

The information system 3 includes the PLC 10 and the client device 80. The PLC 10 and the client device 80 are connected to each other via a communication cable 70 on the basis of, for example, EtherIP (registered trademark) for communication. The PLC 10 and the client device 80 are capable of transmitting and receiving data to and from each other via the communication cable 70. For instance, the PLC 10 and the client device 80 exchange data in conformity to OPC UA (OPC Unified Architecture), which is a communications protocol for use in industrial data exchange. OPC UA is a machine-to-machine communication protocol for industrial applications that is independent of manufacturers and platforms and that is safe and reliable. OPC UA is an architecture of a generalized and wide-range version of conventional OPC (Object Linking and Embedding for Process Control).

In the information system 3, the PLC 10 supports OPC UA and has an OPC UA server function (that is, a function of connecting to an OPC UA client). Specifically, the PLC 10 is configured to connect to the client device 80 as an OPC UA client on the basis of the OPC UA standard, and in response to a service request from the client device 80 (for example, a data reading request), carry out the service and return a response.

In the management system 1 (information system 3), the client device 80 supports OPC UA, and issues a service request (for example, a data readout request) to the PLC 10 as an OPC UA server. The client device 80 may have SCADA (supervisory control and data acquisition) software installed thereon. The client device 80 may be a device to function as a MES (manufacturing execution system).

The PLC 10 (in particular, the CPU unit 100) supports an OPC UA communication, which both allows a generalized connection mode and deals with security risk. The PLC 10 is thus capable of outputting a response securely in response to a request for collection of production progress information from the client device 80 as a higher level system that supports OPC UA and that, for example, has SCADA or functions as a MES. The PLC 10 is capable of securely receiving, for example, a production instruction from the client device 80. The client device 80 as an OPC UA client is configured to connect to the PLC 10 (in particular, the CPU unit 100) as an OPC UA server via a communication cable 70. The client device 80 is capable of reading and writing a variable on the CPU unit 100 through an OPC UA communication.

Specifically, the client device 80 outputs, to the PLC 10 in a connection mode that conforms to, for example, an OPC UA standard, a request to collectively query about respective values that a plurality of variables (for example, variables A to C) have while the PLC 10 is carrying out tasks. When the PLC 10 has received the request, the PLC 10, while carrying out a control process, reads respective values of a plurality of variables (for example, variables A to C) specified in the request, in such a manner that synchronization is ensured of the readout values. The PLC 10 then collectively outputs, to the client device 80 in a connection mode that conforms to, for example, an OPC UA standard, the respective readout values of the plurality of variables. The client device 80 is capable of collectively obtaining respective values of a plurality of variables that the PLC 10 is using for a control process, in particular, respective values of a plurality of variables which respective values have been updated as the result of carrying out a control process.

The description above has outlined the entire management system 1 including the PLC 10 with reference to FIG. 2. The description below deals with the hardware configuration of the CPU unit 100 of the PLC 10 with reference to FIG. 3.

{Hardware Configuration of CPU Unit}

Figure 3:
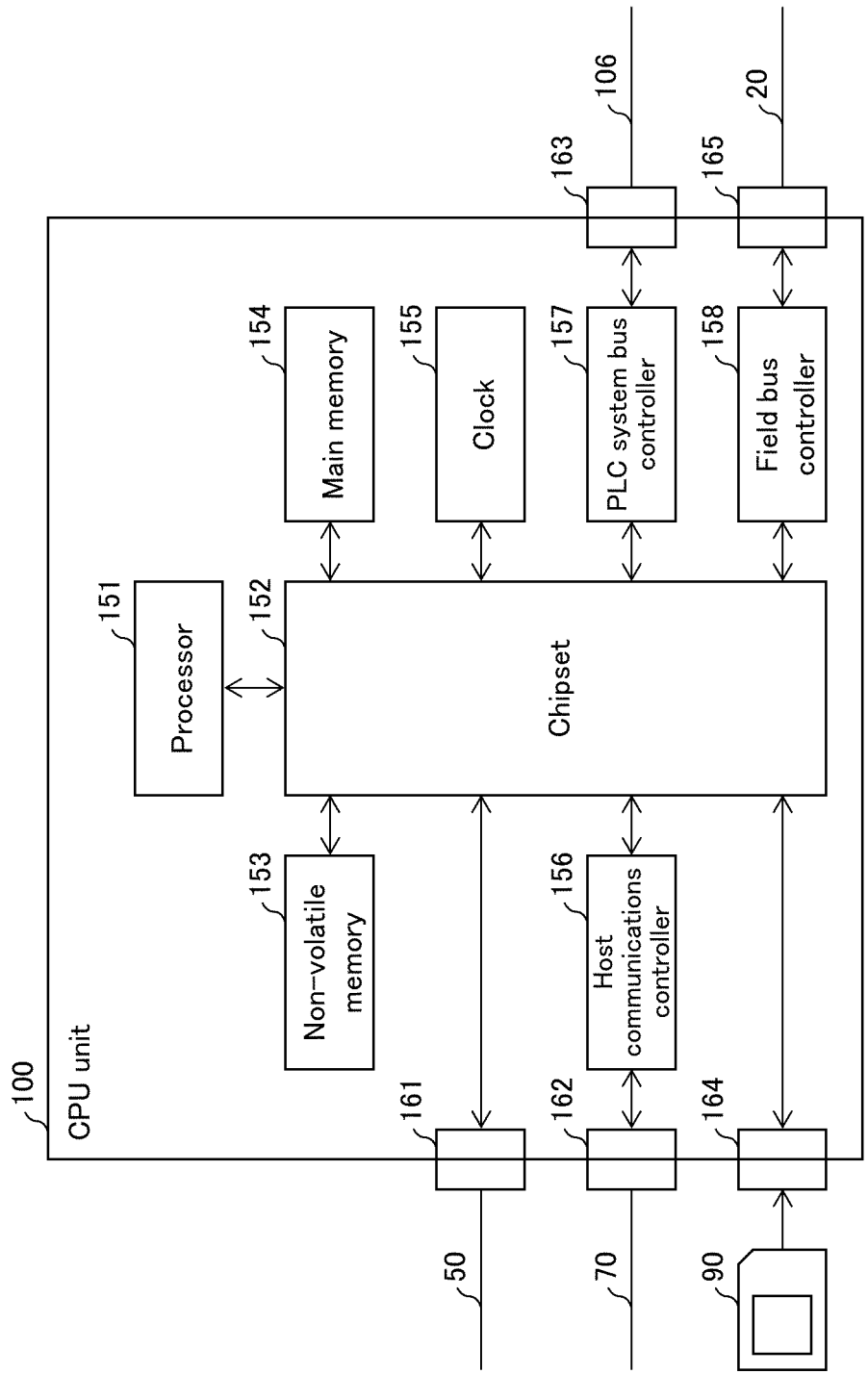
FIG. 3 is a diagram illustrating the hardware configuration of the CPU unit of FIG. 1.

FIG. 3 is a diagram illustrating an example hardware configuration of the CPU unit 100 in accordance with the present embodiment. The CPU unit 100 includes a processor 151, a chipset 152, a non-volatile memory 153, a main memory 154, a clock 155, a host communications controller 156, a PLC system bus controller 157, a field bus controller 158, a USB connector 161, a host communications connector 162, a PLC system bus connector 163, a memory card interface 164, and a field bus connector 165. The chipset 152 is connected to other components with use of various buses.

The processor 151 and the chipset 152 are each configured typically in conformity to a general computer architecture. The processor 151 is thus configured to interpret and execute an instruction code fed sequentially by the chipset 152 in accordance with an internal clock.

The chipset 152 is configured to exchange internal data with various components connected thereto and generate an instruction code necessary for the processor 151. The chipset 152 also has the function of caching, for example, data obtained by the processor 151 carrying out an arithmetic process.

The CPU unit 100 includes a main memory 154 and a non-volatile memory 153 as storage means. The main memory 154 is a volatile storage area (RAM), and stores various programs to be executed by the processor 151 when the CPU unit 100 has been turned on. The main memory 154 is also used as a working memory for when the processor 151 executes various programs. Examples of the main memory 154 include a DRAM (dynamic random access memory) and an SRAM (static random access memory).

The non-volatile memory 153 stores, in a nonvolatile manner, system programs for input-output (IO) control and the like, user programs, motion arithmetic programs, various application programs, and data such as system setting parameters. These programs and data are copied to the main memory 154 as necessary to be accessible to the processor 151. The non-volatile memory 153 may be a semiconductor memory such as a flash memory. The non-volatile memory 153 may alternatively be, for example, a magnetic recording medium such as a hard disk drive or an optical recording medium such as a DVD-RAM (digital versatile disk random access memory).

The clock 155 is configured to generate a system clock having a predetermined cycle, and feeds the system clock to the processor 151. Specifically, the clock 155 is configured to generate an interrupt signal at a fixed time interval (cycle) and feed the interrupt signal to the processor 151. The clock 155 is typically configured to generate different interrupt signals at respective time intervals different from each other depending on the specification of the hardware. The clock 155 may be set by, for example, the OS (operating system) or BIOS (basic input output system) to generate an interrupt signal at a time interval. Using an interrupt signal generated by the clock 155 allows a control operation as described later for each cycle in which a task is carried out.

The CPU unit 100 includes a host communications controller 156, a PLC system bus controller 157, and a field bus controller 158 as communication means. The host communications controller 156, the PLC system bus controller 157, and the field bus controller 158 each include a buffer memory (transmission buffer memory) (not shown), a communication control circuit (not shown), and a DMA (dynamic memory access) control circuit (not shown). The above communication means are configured to (i) transmit output data to units other than the CPU unit 100 and devices other than the PLC 10 and (ii) receive input data from units other than the CPU unit 100 and devices other than the PLC 10. The above communication means are also configured to transmit and receive data to and from the main memory 154.

The DMA control circuit of each of the host communications controller 156, the PLC system bus controller 157, and the field bus controller 158 is configured to transfer (i) output data from the main memory 154 to the corresponding buffer memory and (ii) input data from the corresponding buffer memory to the main memory 154. The buffer memory of each of the host communications controller 156, the PLC system bus controller 157, and the field bus controller 158 has two functions: The buffer memory functions as a transmission buffer for data (output data) to be outputted to devices other than the PLC 10 and units other than the CPU unit 100. The buffer memory also functions as a reception buffer for data (input data) to be inputted from devices other than the PLC 10 and units other than the CPU unit 100.

The host communications controller 156 is connected to a communication cable 70 via the host communications connector 162, and is configured to connect to, for example, the client device 80 as an OPC UA client on the basis of an OPC UA standard. Specifically, the host communications controller 156 is configured to receive a service request (for example, a data readout request) from the client device 80 and transmit the result of carrying out the service to the client device 80 (that is, return a response to the client device 80).

The PLC system bus controller 157 is connected to a PLC system bus 106 via the PLC system bus connector 163, and is configured to control data exchange over the PLC system bus 106. The PLC system bus controller 157 provides functions of, for example, a physical layer and a data link layer for the PLC system bus 106. The PLC system bus controller 157 is, in other words, configured to control transmission between the CPU unit 100 and units other than the CPU unit 100 that are connected to the PLC system bus 106.

The PLC system bus controller 157 is configured to transmit data (output data) stored in its buffer memory to each of the IO units 102 to 104 and the special unit 105 over the PLC system bus 106. The PLC system bus controller 157 is also configured to receive data (input data) inputted from each of the IO units 102 to 104 and the special unit 105 over the PLC system bus 106 and store the data in the buffer memory of the PLC system bus controller 157.

The field bus controller 158 is connected to a field network 20 via the field bus connector 165, and is configured to control data exchange over the field network 20. The field bus controller 158 provides functions of, for example, a physical layer and a data link layer for the field network 20.

The field bus controller 158 is, in other words, configured to control transmission of output data and reception of input data in accordance with a standard of the field network 20 used. Specifically, the field bus controller 158 is configured to (i) transmit output data in its buffer memory to field equipment connected to the field network 20 and (ii) receive input data from the field equipment and store the input data in the buffer memory of the field bus controller 158.

The USB connector 161 is an interface for connecting the support device 60 and the CPU unit 100 to each other. A connection cable 50 is connected to the USB connector 161. For instance, an executable program transferred from the support device 60 is received by the CPU unit 100 over the connection cable 50. The memory card interface 164 is configured to allow a memory card 90 capable of being attached to and detached from the CPU unit 100 to be connected to the processor 151.

The description above has dealt with the hardware configuration of the CPU unit 100 with reference to FIG. 3. With reference to FIG. 1, the description below deals with, for example, (i) the configuration of the PLC 10 including the CPU unit 100 and (ii) details of processes by the PLC 10 with reference to, for example, FIG. 1. Before the details are described with reference to FIG. 1, the description below outlines the PLC 10 to facilitate understanding of the PLC 10.

(Outline of Functionality of Control Device)

A PLC 10 (control device) is a control device configured to control control-target equipment by concurrently repeating a plurality of tasks each over a corresponding cycle, the control device including: an OPC UA input section 111 (accepting section) configured to accept from outside (for example, a client device 80) a request to collectively query about respective values that a plurality of variables have while the plurality of tasks are being carried out, the plurality of variables each having a value that becomes updated for at least one of the plurality of tasks; a reading section 112 configured to, in a case where the OPC UA input section 111 has accepted the request, read the respective values of the plurality of variables, the respective values each having been updated for the at least one of the plurality of tasks, in such a manner that the reading section completes reading all the respective values of the plurality of variables during a time period from (i) a time point of a start of a single instance of a cycle of a task (for example, task Tp) which cycle is shortest among respective cycles of the plurality of tasks to (ii) a time point of an end of the single instance of the cycle; and an OPC UA output section 113 (output section) configured to output, to outside, the respective values of the plurality of variables, the respective values having been read by the reading section 112.

With the above configuration, the PLC 10 controls control-target equipment by concurrently repeating a plurality of tasks each over a corresponding cycle. Further, in a case where the request has been accepted, the PLC 10 reads the respective values of the plurality of variables, the respective values each having been updated for the at least one of the plurality of variables, in such a manner that reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle. The PLC 10 also outputs, to outside, the respective values of the plurality of variables, the respective values having been read.

The PLC 10 is thus advantageously capable of (i) carrying out a plurality of tasks concurrently and periodically and (ii) in a case where the PLC 10 has accepted from outside a request to collectively query about respective values as updated of a plurality of variables while the PLC 10 is carrying out the plurality of tasks, returning respective values as updated of a plurality of variables which respective values are in synchronization with each other.

Synchronization is not ensured of a plurality of readout values in a case where reading of the respective values as updated of the plurality of variables becomes completed at respective time points that coincide with two or more instances of a "cycle of a task which cycle is shortest" (hereinafter referred to as "basic cycle"). In other words, synchronization is not ensured of a plurality of readout values in a case where reading of the respective values as updated of the plurality of variables becomes completed at respective time points that are apart from each other by not shorter than a basic cycle.

This is clearly understood in view of, for example, a case where tasks Tp and Ts are carried out concurrently and periodically, the task Tp corresponding to the basic cycle and involving updating the value of a variable A, the task Ts corresponding to a cycle different from the basic cycle and involving updating the value of a variable C (which is different from the variable A).

Specifically, in a case where there is a time interval of not shorter than the basic cycle between (i) the time point at which reading of the value as updated of a variable A becomes completed and (ii) the time point at which reading of the value as updated of a variable C becomes completed, the task Tp will be carried out one or more times during the time interval. This will result in the user obtaining the value of the variable A and the value that the variable C has after (i) the value of the variable A has been read and (ii) the task Tp (which involves updating the value of the variable A) has subsequently been carried out one or more times. The above operation will thus fail to (i) ensure synchronization between the respective readout values of the variables A and C and (ii) allow the user to understand the relationship between the respective values as updated of a plurality of variables which respective values are in synchronization with each other. The user will, in other words, be unable to obtain the respective values of the variables A and C which respective values were updated substantially simultaneously for the respective tasks Tp and Ts (which are carried out concurrently and periodically). In the above-described example, the user obtains the value of the variable A and the value that the variable C has after (i) the value of the variable A has been read and (ii) the task Tp (which involves updating the value of the variable A) has subsequently been carried out one or more times.

In contrast, the PLC 10 is configured to (i) read the respective values of the plurality of variables, the respective values each having been updated for the at least one of the plurality of tasks, in such a manner that the PLC 10 completes reading all the respective values of the plurality of variables during a single instance of a cycle of a task which cycle is shortest among respective cycles of the plurality of tasks and (ii) output, to outside, the respective values of the plurality of variables, the respective values having been read. The PLC 10 is, in other words, configured to (i) read the respective values as updated of the plurality of variables in such a manner as to complete reading the respective values as updated of the plurality of variables at respective time points that are apart from each other by a time interval shorter than the basic cycle and (ii) output, to outside, the respective readout values of the plurality of variables.

In the above-described example, the PLC 10 reads the respective values as updated of the variables A and C in such a manner as to complete reading the respective values as updated of the variables A and C at respective time points that are apart from each other by a time interval shorter than the basic cycle. The PLC 10 reads the respective values as updated of the variables A and C in such a manner as to not carry out either of the tasks Tp and Ts during a time period from (i) the time point at which the PLC 10 completes reading the value as updated of the variable A and (ii) the time point at which the PLC 10 completes reading the value as updated of the variable C.

The PLC 10 thus allows the user to obtain a value as updated of each of a plurality of variables that have been updated substantially simultaneously for each of a plurality of tasks carried out concurrently, that is, to obtain a value as updated of each of a plurality of variables with ensured synchronization. In other words, in a case where the PLC 10 has been collectively queried about respective values as updated of a plurality of variables while the PLC 10 is carrying out tasks, synchronization is ensured of respective values as updated of the plurality of variables which respective values the PLC 10 returns as a response.

In the above-described example, the PLC 10 allows the user to obtain (i) the value of the variable A which value has been updated for the task Tp and (ii) the value of the variable C which value has been updated for the task Ts substantially simultaneously with the update of the variable A. In other words, the PLC 10 allows the user to obtain respective values as updated of variables A and C synchronization of which respective values is ensured.

The reading section 112 of the PLC 10 starts reading the respective values of the plurality of variables by a time point obtained by subtracting an expected reading period from a time point at which the respective cycles of the plurality of tasks start together, the expected reading period being a time period expected to be necessary to read all the respective values of the plurality of variables.

With the above arrangement, the PLC 10 starts reading the respective values of the plurality of variables by a time point obtained by subtracting an expected reading period from a time point at which the respective cycles of the plurality of tasks start together, the expected reading period being a time period expected to be necessary to read all the respective values of the plurality of variables.

The PLC 10, in other words, reads the respective values as updated of the plurality of variables with use of (i) information on a time point at which the respective cycles of the plurality of tasks start together and (ii) information on an expected reading period, which is a time period expected to be necessary to read all the respective values of the plurality of variables. The PLC 10, in other words, does not need to determine, in order to read the respective values as updated of the plurality of variables, which of the plurality of tasks involves updating the value of each of the plurality of variables.

The PLC 10 is thus advantageously capable of reading the respective values as updated of the plurality of variables through a process that is feasible as compared to the case of determining which of the plurality of tasks involves updating the value of each of the plurality of variables.

The PLC 10 has an OPC UA server function; the OPC UA input section 111 accepts the request from a client device 80 (OPC UA client device) in a connection mode that conforms to an OPC UA standard; and the OPC UA output section 113 outputs the respective values of the plurality of variables to the client device 80 in a connection mode that conforms to an OPC UA standard.

With the above arrangement, the PLC 10 has an OPC UA server function, accepts the request from a client device 80 in a connection mode that conforms to an OPC UA standard, and outputs the respective values of the plurality of variables to the client device 80 in a connection mode that conforms to an OPC UA standard.

The PLC 10 thus advantageously accepts the request in a connection mode that conforms to an OPC UA standard (which is a machine-to-machine communication protocol for industrial applications that is independent of manufacturers and platforms and that is safe and reliable), and outputs the respective values of the plurality of variables in a connection mode that conforms to an OPC UA standard.

The PLC 10 may be arranged such that the plurality of tasks include a standard task (for example, task Tp) and a task (for example, task Ts) other than the standard task, and the task other than the standard task has a cycle with a length of an integral multiple of a length of a cycle of the standard task.

With the above arrangement, the PLC 10 is arranged such that the plurality of tasks include a standard task and a task other than the standard task, and the task other than the standard task has a cycle with a length of an integral multiple of a length of a cycle of the standard task.

The PLC 10 is thus advantageously capable of allowing the plurality of tasks to be in synchronization with each other easily, that is, allowing the respective cycles of the plurality of tasks to start together easily.

The description above has outlined the PLC 10. The description below then deals with details of the PLC 10 such as its configuration, in particular, details such as the configuration of the CPU unit 100, with reference to, for example, FIG. 1.

(Details of Functionality of Control Device)

FIG. 1 is a block diagram illustrating the configuration of a main part of the CPU unit 100 in accordance with Embodiment 1 of the present invention. As illustrated in FIG. 1, the CPU unit 100 includes, as functional blocks, an OPC UA server section 110, a storage section 120, and a control section 130. The CPU unit 100 is an entity that carries out a control process for controlling control-target equipment. The control section 130 is configured to carry out tasks including programs. The control section 130 is, in particular, configured to concurrently carry out a plurality of tasks (for example, tasks Tp and Ts) each over a corresponding cycle. The storage section 120 is configured to store variables that can be referred to and/or updated for programs. The OPC UA server section 110 is configured to, while the control section 130 is carrying out tasks including programs, communicate with the client device 80 and carry out a process requested by the client device 80 such as collecting variables stored in a variables table 122 of the storage section 120.

For concise descriptions, members that are not directly related to the present embodiment are omitted from the description or the block diagram. The CPU unit 100 may include those omitted members as necessary. The OPC UA server section 110 and the control section 130 illustrated in FIG. 1 as an example may be realized by, for instance, the processor 151 (central processing unit (CPU)) illustrated in FIG. 3 as an example or the like (i) reading programs stored on the non-volatile memory 153 (that is, the storage section 120) in the form of, for example, a read only memory (ROM) or non-volatile random access memory (NVRAM)

onto the main memory 154 in the form of, for example, a RAM and (ii) executing the programs. The description below deals with each functional block of the CPU unit 100.

(Details of Functional Blocks other than Storage Section—(1): OPC UA Server Function)

The OPC UA server section 110 allows the information system 3 (in particular, the client device 80) and the control system 2 (in particular, the PLC 10) to communicate with each other. The OPC UA server section 110, for instance, allows the PLC 10 to operate as an OPC UA server for an OPC UA server function. Specifically, the OPC UA server section 110 is configured to (i) receive an OPC UA service request from the client device 80, (ii) carry out an OPC UA service process in accordance with the service request received, and (iii) output, to the requesting client device 80, a response indicative of the result of carrying out the OPC UA service process.

For the present embodiment, the client device 80 requests the PLC 10 to carry out an OPC UA service (process) such as a process called "Subscription". The "Subscription" process refers to a process of reading data (in particular, the respective values of variables for use in a control process; specifically, the respective values of variables to be updated during a control process) related to a control process to be carried out by the PLC 10 (in particular, the control section 130). The description below may use the term "Write" to refer to a process of updating the value of a variable and the term "Read" to refer to a process of reading the value of a variable.

A "Subscription" (through which the client device 80 requests the PLC 10 to carry out a process) is, for example, a process of collectively reading the respective values of a plurality of variables (that is, a "Read" process). The description below uses the abbreviation "SubX" to refer to a Subscription process (through which the client device 80 requests the PLC 10 to carry out a process) of collectively reading the respective values of variables A to C.

The OPC UA server section 110 illustrated in FIG. 1 as an example includes as functional blocks an OPC UA input section 111, a reading section 112, an OPC UA output section 113, a reading period calculating section 114, and a reading time point selecting section 115. The OPC UA input section 111 of the OPC UA server section 110 is an example of the "accepting section" of the present invention. The reading section 112 is an example of the "reading section" of the present invention. The OPC UA output section 113 is an example of the "output section" of the present invention.

The client device 80 and the CPU unit 100 exchange information with each other with use of the OPC UA input section 111 and the OPC UA output section 113. In other words, the OPC UA input section 111 and the OPC UA output section 113 are each a functional block for connecting to the client device 80, which functions as an OPC UA client, on the basis of an OPC UA standard for communication.

The OPC UA input section 111 is configured to (i) receive a request to carry out a predetermined process from the client device 80 over the communication cable 70 and (ii) instruct the reading section 112 to carry out the predetermined process corresponding to the request received. The OPC UA input section 111, for instance, receives an OPC UA service request (that is, an OPC UA request message) from the client device 80, and instructs the reading section 112 to carry out a process corresponding to the service request received. For the present embodiment, an OPC UA service request is, for example, a request involving access to data in a system such as reading a variable to be used while the PLC 10 (in particular, the CPU unit 100) is carrying out a control process (in particular, a variable whose value is to be updated while the PLC 10 is carrying out a control function). Specifically, the OPC UA input section 111 accepts, from the client device 80, a request to carry out SubX (that is, a request message), in other words, a request to carry out a process of collectively reading the respective values of variables A to C (Read).

The OPC UA output section 113 is configured to transmit, to the client device 80, the result of carrying out a process corresponding to a request (that is, a service request) to carry out a predetermined process which request the OPC UA input section 111 has received from the client device 80. The OPC UA output section 113 is configured to transmit the above result over the communication cable 70 as a response to the request. Specifically, the OPC UA output section 113 obtains, from the reading section 112, the result of a process that the OPC UA input section 111 has instructed the reading section 112 to carry out, and transmits the obtained result to the client device 80. The OPC UA output section 113 transmits the result, obtained from the reading section 112, to the client device 80 in, for example, a connection mode that conforms to an OPC UA standard.

When the OPC UA input section 111 has accepted a SubX request message from the client device 80, the OPC UA output section 113 transmits to the client device 80 the result of carrying out SubX. Specifically, the OPC UA output section 113 collectively transmits to the client device 80 the respective values that the variables A to C had while the control section 130 was carrying out a control process and that the reading section 112 read.

The reading section 112, the reading period calculating section 114, and the reading time point selecting section 115 are configured to carry out a process corresponding to a request to carry out a predetermined process which request the OPC UA input section 111 has received from the client device 80, for example, an OPC UA service process (in this example, SubX). In other words, the reading section 112, the reading period calculating section 114, and the reading time point selecting section 115 are configured to read the respective values that the variables A to C had while the control section 130 was carrying out a control process (Read).

The reading section 112 is a means of carrying out an OPC UA service related to reading of the value of a variable. The reading section 112, at a reading time point of which the reading section 112 has been notified by the reading time point selecting section 115, collects the respective values of variables whose respective values are updated for each task (in particular, the values as updated), in other words, reads the respective values of variables. In particular, while the control section 130 (in particular, an arithmetic section 131) is carrying out tasks, the reading section 112, at a reading time point of which the reading section 112 has been notified by the reading time point selecting section 115, reads the respective values of variables whose respective values have been updated for each task (Read). Specifically, the reading section 112, at a reading time point specified by the reading time point selecting section 115, refers to the variables table 122 in the storage section 120 and reads the respective values of the variables A to C. In other words, the reading section 112, at a reading time point specified by the reading time point selecting section 115, starts a process of referring to the variables table 122 in the storage section 120 and reading the respective values of the variables A to C.

The reading period calculating section 114 is configured to calculate an expected reading period, which is a time length necessary for the reading section 112 to carry out a process of referring to the variables table 122 and reading the respective values of desired variables (for example, variables A to C). The reading period calculating section 114 may be configured to calculate an expected reading period on the basis of, for example, the data type of each variable whose value is to be read by the reading section 112 (specifically, Byte, Int, Long, or the like). The reading period calculating section 114 may be configured to calculate an expected reading period on the basis of, for example, the number of variables whose respective values are to be read by the reading section 112 (specifically, if the reading section 112 is to read the respective values of the variables A to C, three). The reading period calculating section 114 may be configured to calculate an expected reading period on the basis of, for example, both the data type of each variable whose value is to be read by the reading section 112 and the number of variables whose respective values are to be read by the reading section 112.

For instance, the reading period calculating section 114 calculates, as a time length necessary for the reading section 112 to carry out SubX, the sum of time lengths Ya, Yb, and Yc necessary for the reading section 112 to (i) refer to the variables table 122 and (ii) read the respective values of variables A to C. Supposing that a time length necessary for the reading section 112 to carry out SubX is an expected reading period Y μs (where "μs" is a unit), the reading period calculating section 114 calculates the expected reading period Y as "expected reading period Y=Ya+Yb+Yc". The reading period calculating section 114 notifies the reading time point selecting section 115 of the expected reading period Y μs calculated.

The reading time point selecting section 115 is configured to (i) select a reading time point, which is a time point at which the reading section 112 starts a reading process, and (ii) notify the reading section 112 of the reading time point selected. The reading time point selecting section 115 is configured to select a reading time point, which is a time point at which the reading section 112 starts a reading process, in such a manner as to satisfy the condition below while the control section 130 is carrying out a control process.

Specifically, the reading time point selecting section 115 selects a time point of reading each of a plurality of variables P and Q (which are a target of a reading process) in such a manner that the respective values of the variables P and Q are not updated during a time period from (i) a time point at which reading of the value of the variable P (which is one of the variables P and Q) becomes completed to (ii) a time point at which reading of the value of the variable Q (which is another one of the variables P and Q) becomes completed. In other words, the reading time point selecting section 115 selects a time point of reading each of a plurality of variables P and Q in such a manner that no task (in particular, program) that involves updating the value of the variable P or Q is carried out during a time period from (i) a time point at which reading of the value of the variable P becomes completed to (ii) a time point at which reading of the value of the variable Q becomes completed.

Specifically, in a case where the control section 130 concurrently repeats a plurality of tasks each over a corresponding cycle, the reading time point selecting section 115 selects a time point of reading each of the variables P and Q as follows: The reading time point selecting section 115 selects a time point of reading each of the variables P and Q in such a manner that the time interval between (i) a time point at which reading of the value of the variable P becomes completed and (ii) a time point at which reading of the variable Q becomes completed is shorter than the cycle (in the above-described example, 1 ms) of a task whose cycle is the shortest among the respective cycles of the plurality of tasks.

In particular, in a case where the control section 130 concurrently repeats a plurality of tasks each over a corresponding cycle in a time-sharing manner, the reading time point selecting section 115 selects a time point of reading each of the variables P and Q as follows: The reading time point selecting section 115 selects a time point of reading each of the variables P and Q in such a manner that the time interval between a time point at which reading of the value of the variable P becomes completed and a time point at which reading of the value of the variable Q becomes completed is shorter than the cycle (in the above-described example, 1 ms) of a task with the highest priority among the plurality of tasks.

Specifically, the reading time point selecting section 115 selects a reading time point as below as a time point at which the reading section 112 starts SubX (that is, reading the respective values of the variables A to C while the control section 130 is carrying out a control process (Read)). The reading time point selecting section 115 selects a reading time point in such a manner that respective time points at which the reading section 112 completes reading of the respective values of the variables A to C fall between (i) a time point at which a single cycle of a task Tp starts and (ii) a time point at which the cycle ends. In other words, the reading time point selecting section 115 selects a reading time point in such a manner that respective time points at which the reading section 112 completes reading of the respective values of the variables A to C fall between (i) a time point at which a single cycle of a task Tp (which has a cycle that is the shortest among the respective cycles of a plurality of tasks that the control section 130 carries out) starts and (ii) a time point at which the cycle ends.

In particular, the reading time point selecting section 115 is configured to select a reading time point with reference to an expected reading period Y μs of which the reading time point selecting section 115 has been notified by the reading period calculating section 114. Specifically, the reading time point selecting section 115 selects a reading time point by subtracting, from a time point at which the respective cycles of a plurality of tasks that the control section 130 carries out start together, an expected reading period Y μs, which is a time period expected to be necessary to read all the respective values of the variables A to C. For instance, the reading time point selecting section 115 selects a reading time point by subtracting an expected reading period Y μs from t=2 ms, which is a time point at which the respective cycles of the tasks Tp and Ts start together. Synchronization is ensured of the respective readout values of the variables A to C in a case where the reading section 112 reads the respective values of the variables A to C at a time point obtained by subtracting an expected reading period Y μs from a time point at which the respective cycles of a plurality of tasks that the control section 130 carries out start together (this will be detailed later with reference to FIG. 4).

(Details of Functional Blocks other than Storage Section—(2): Control Function)

The control section 130 is an entity that carries out a control process for controlling a control target such as a machine and a facility. The control section 130 carries out a process of controlling a control target by repeating (i) transmission of output data, (ii) reception of input data, and (iii) execution of a control program for generating output data with use of the input data. The control section 130 includes (i) an arithmetic section 131 configured to carry out a control program for generating output data with use of input data and (ii) a field communication section 132 configured to carry out transmission of output data and reception of input data. The control section 130 is similar to a control section (as an entity that carries out a control process for controlling a control target such as a machine and a facility) of a conventional CPU unit (PLC) that does not have an OPC UA server function.

The arithmetic section 131 is configured to (i) with use of input data that the field communication section 132 has obtained, carry out various programs such as a control program to generate output data and (ii) output the output data generated to the field communication section 132. The arithmetic section 131 carries out various programs by, specifically, concurrently carrying out a plurality of tasks each over a corresponding cycle. The arithmetic section 131, for instance, concurrently carries out a plurality of tasks each over a corresponding cycle in a time-sharing manner. The arithmetic section 131, in other words, carries out processes in a multi-tasking manner. Each task includes carrying out a control program such as a user program corresponding to the task.

The arithmetic section 131, for instance, concurrently carries out tasks Tp and Ts in a time-sharing manner. The arithmetic section 131 carries out the task Tp over a period of 1 ms and the task Ts over a period of 2 ms. The arithmetic section 131 may be configured to further carry out a task Tt, which is other than the tasks Tp and Ts, over a cycle of 4 ms.

Tasks that the arithmetic section 131 carries out may include not only tasks that are repeated regularly (that is, tasks that are carried out periodically; specifically, tasks Tp and Ts) but also a task that is carried out if a preset condition is met. Such a task that is carried out if a preset condition is met is called "event task", for example. Specifically, a task Te may be an event task.

The field communication section 132 is configured to exchange data with various pieces of field equipment (such as the devices 31 and 32 and servo drivers 33 and 34) over at least one of the PLC system bus 106 and the field network 20. These pieces of field equipment include (i) an actuator for carrying out a process for a control target and (ii) a sensor for obtaining various pieces of information from a control target.

The field communication section 132, for instance, obtains input data from the device 31 as input equipment and outputs output data to, for example, the device 32, the servo driver 33, and/or the servo driver 34 each as output equipment.

(Details of Storage Section)

The storage section 120 is a storage device configured to store various pieces of data for use by the CPU unit 100. The storage section 120 may non-temporarily store (i) control programs that the CPU unit 100 carries out, (ii) OS programs, (iii) application programs for carrying out various functions that the CPU unit 100 has, and (iv) various pieces of data to be read when the application programs are executed. The storage section 120 further stores a program table 121, a variables table 122, and a task table 123.

The program table 121 contains various programs to be executed by the control section 130 (in particular, the arithmetic section 131). The storage section 120 may store, separately from the program table 121 and as, for example, application programs (that is, application programs that achieve an OPC UA server function), programs to be executed by the OPC UA server section 110.

The program table 121, which is a group of various programs to be executed by the control section 130 (in particular, the arithmetic section 131), may have the following three levels: a real-time OS, system programs, and user programs.

The real-time OS is designed in accordance with the computer architecture of the CPU unit 100. The real-time OS provides a basic environment for the processor 151 to execute system programs and user programs. The real-time OS is typically provided by, for example, a PLC manufacturer or a dedicated software company.

The system programs are a software group for providing functions as the PLC 10 (in particular, the CPU unit 100). Specific examples of the system programs include a scheduler program, output process programs, input process programs, a sequence command arithmetic program, a motion arithmetic program, and other system programs. The output process programs include a program for carrying out a process of outputting the result of an arithmetic operation by the CPU unit 100 to the IO units 102 to 104 as output units. The input process programs include a program for carrying out a process of causing the CPU unit 100 to receive a signal inputted to the IO units 102 to 104 as input units. Typically, an output process program and an input process program are carried out continuously (as a whole). An output process program and an input process program together may thus be referred to collectively as IO process programs.

The user programs are created according to the purpose of control by the user. The user programs are, in other words, designed as appropriate according to, for example, a line (process) as a target to be controlled with use of the control system 2. The user programs are configured to be editable by the support device 60 connected to the CPU unit 100. The user programs may be written in a plurality of languages such as ladder language, SFC language, and structured text.

The user programs achieve the purpose of control by the user in conjunction with the sequence command arithmetic program and the motion arithmetic program. In other words, the user programs each allow a programmed operation with use of, for example, commands, functions, and/or function modules provided by the sequence command arithmetic program and the motion arithmetic program. The user programs, the sequence command arithmetic program, and the motion arithmetic program may thus be referred to collectively as control programs.

The variables table 122 contains variables for use by programs (in particular, control programs such as user programs). The respective values of variables in the variables table 122 are updated (that is, Written) when control programs such as user programs are executed.

The task table 123 contains information related to tasks. The task table 123 contains information on, for example, the name of each task, the priority of each task, the cycle over which each task is carried out (that is, the control cycle), and the configuration of programs such as user programs to be executed for each task. The CPU unit 100 may use a control cycle of a preset time length (for example, 1 ms) as a common cycle for the entire process. The common cycle may be referred to as a "standard cycle". A task with a standard cycle as a control cycle (that is, a cycle) may be referred to as a "standard task".

The arithmetic section 131 of the PLC 10 (specifically, the CPU unit 100) is configured to execute various programs in the program table 121 in execution units called "tasks". In other words, the PLC 10 is configured to allocate control programs such as user programs to each task for execution. For instance, the user programs include a plurality of user programs, each of which is allocated to one of a plurality of tasks. Further, the PLC 10 is configured to carry out tasks that are roughly classified into (i) cyclically executed tasks, which are each executed cyclically, and (ii) event-driven tasks, which are each executed when an event has occurred.

The program table 121, which contains processes and programs that the arithmetic section 131 is capable of carrying out and executing for tasks, contains IO process programs, control programs, and other processes and programs as described above.

The user can use the support device 60 to set a task, which is an execution unit of a program. Specifically, the user can set and/or define, for example, (i) a cycle for a task, (ii) a time point at which to carry out the task, (iii) programs (for example, control programs) to be executed for the task, and/or (iv) whether it is necessary to carry out IO control during the task. The user may use the support device 60 to allocate a maximum of, for example, 128 programs for a single task. Settings for a task are transferred from the support device 60 over, for example, the connection cable 50 to the CPU unit 100, where the settings are stored in the task table 123 of the storage section 120 (which is in the form of, for example, a non-volatile memory 153).

The user can use the support device 60 to prioritize a plurality of tasks. Specifically, the user can use the support device 60 to set three kinds of tasks having respective priorities different from each other: a task Tp as a primary fixed-cycle task, a task Ts as a fixed-cycle task, and a task Te as an event task. In a case where the arithmetic section 131 of the PLC 10 has started during an identical period to execute a user program for a task with a high priority and a user program for a task with a low priority, the arithmetic section 131 may, during that period, carry out interrupt control of (i) suspending the execution of programs allocated to the task with a low priority and (ii) executing programs allocated to the task with a high priority.

A primary fixed-cycle task and a fixed-cycle task are both cyclically executed tasks. A primary fixed-cycle task has a priority higher than that of a fixed-cycle task. In other words, a primary fixed-cycle task has a priority value smaller than that of a fixed-cycle task. The arithmetic section 131 may be configured to preferentially carry out a task with a small priority value among a plurality of tasks.

A task Tp may include, for example, IO control, user programs, a motion arithmetic program, and optionally a system service as main processes to be carried out. A task Ts may include, for example, IO control, user programs, and optionally a system service as main processes to be carried out. A task Te may include, for example, user programs and optionally a system service as main processes to be carried out. The PLC 10 may be configured such that the arithmetic section 131 of the PLC 10 carries out a task Tp as the top priority and that the user can specify the respective priorities of a task Ts and a task Te. Further, the cyclically executed task (which is carried out cyclically) is not limited to the two tasks Tp and Ts. Three or more cyclically executed tasks (for example, tasks Tp, Ts, and Tt) may have respective set priorities for the order in which the tasks are carried out. Each cyclically executed task may have a set cycle (that is, a cycle over which the task is carried out).

The description above has dealt with how the PLC 10 (in particular, the CPU unit 100) is configured. The description below outlines how the PLC 10 carries out processes (that is, how the PLC operates) with reference to FIG. 4.

§ 3. Example Operation (Outline of Process Carried Out by Control Device)

Figure 4:
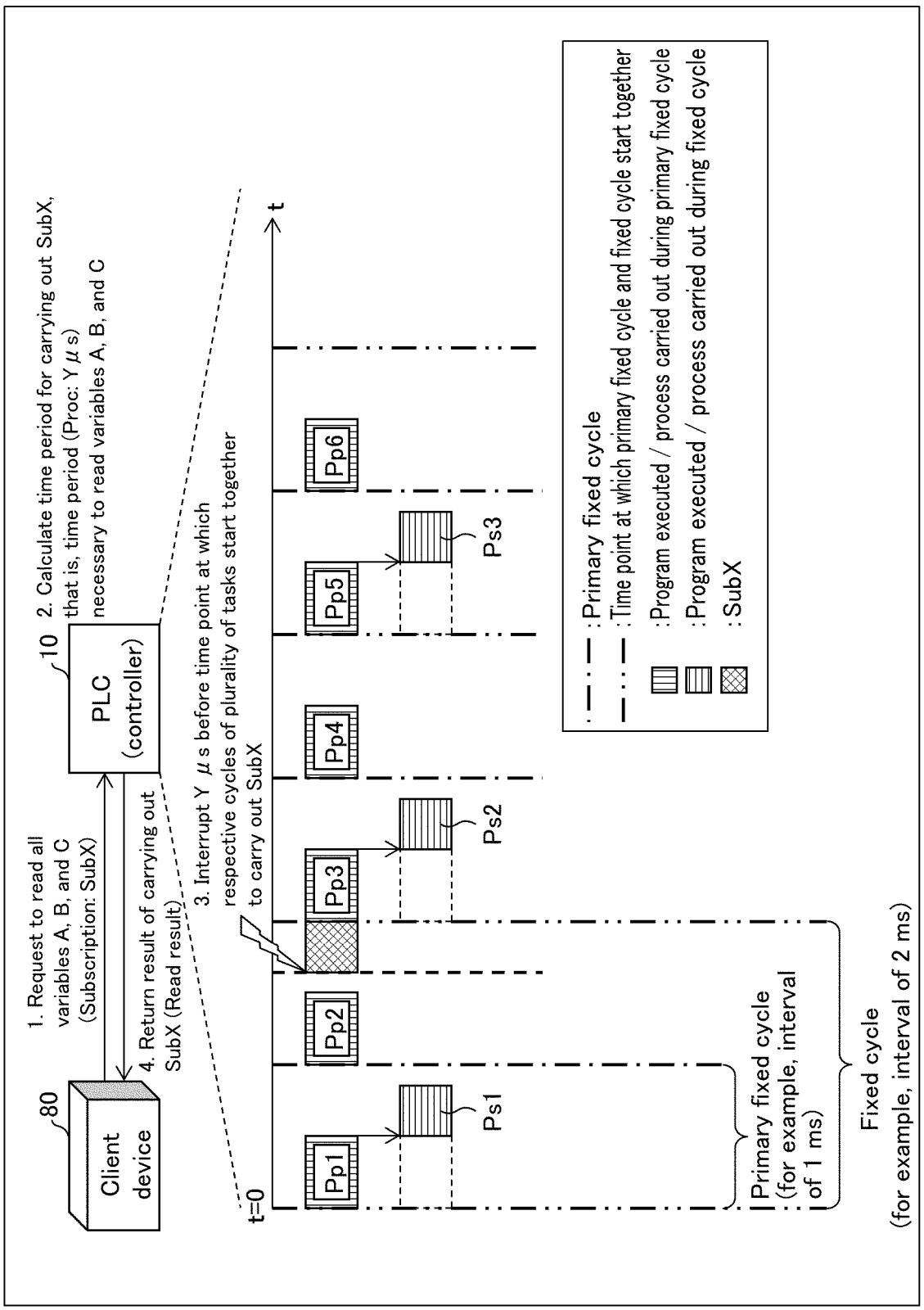
FIG. 4 is a diagram that outlines a process that the CPU unit of FIG. 1 carries out.

FIG. 4 is a diagram that outlines a process that the PLC (in particular, the CPU unit 100) carries out. With reference to FIG. 4, the description below first deals with a multi-tasking process that the PLC 10 carries out.

(Multi-Tasking)

The CPU unit 100 (in particular, the arithmetic section 131) is configured to concurrently repeat a plurality of tasks (in the example illustrated in FIG. 4, tasks Tp and Ts) each over a corresponding period in a time-sharing manner. In other words, the CPU unit 100 carries out processes in a multi-tasking manner, and carries out tasks having respective cycles different from each other.

In the example illustrated in FIG. 4, the task Tp is carried out preferentially over the task Ts and over a cycle of, for example, 1 ms. The task Tp is, in other words, carried out over a cycle equal to a single control cycle (that is, a time length of 1 ms). The task Tp includes a program Pp such as a user program. In other words, a program Pp such as a user program has been allocated to the task Tp. The task Tp is an example "standard task" of the present invention.

The task Ts is prioritized less than the task Tp, and is carried out over a cycle of, for example, 2 ms. The task Ts is, in other words, carried out over a cycle equal to two control cycles (that is, a time length of 2 ms). The task Ts has a cycle with a length of an integral multiple (for example, double) of the length of the cycle of the task Tp. The task Ts include a program Ps such as a user program. In other words, a program Ps such as a user program has been allocated to the task Ts. The task Ts is an example "task other than the standard task" of the present invention.

The CPU unit 100 (in particular, the arithmetic section 131) may be configured to carry out a task Tt, which is prioritized less than the tasks Tp and Ts, over a cycle of 4 ms. The CPU unit 100 may, in other words, carry out the task Tt over a cycle equal to four control cycles (that is, a time length of 4 ms). The task Tt may have a cycle with a length of an integral multiple (for example, quadruple) of the length of the cycle of the task Tp. The task Tt may include a program (such as a user program). The task Tt is an example "task other than the standard task" of the present invention.

The tasks Ts and Tt each have a cycle with a length that is an integral multiple of the length of the cycle of the task Tp as described above. This allows the tasks Tp, Ts, and Tt to be synchronized with each other easily. The tasks Tp, Ts, and Tt becoming synchronized with each other means that the respective cycles (carrying-out cycles) of the tasks Tp, Ts, and Tt start simultaneously (that is, the respective start time points coincide with each other) or that the respective cycles of the tasks Tp, Ts, and Tt end simultaneously (that is, the respective end time points coincide with each other).

(Representation in Drawing)

FIG. 4 shows chain single-dashed lines to each indicate the cycle of a task Tp as a primary fixed-cycle task, in particular, a time point at which the cycle of a task Tp starts or ends. FIG. 4 shows chain double-dashed lines to each indicate the cycle of a task Ts as a fixed-cycle task, in particular, a time point at which the cycle of a task Ts starts or ends. FIG. 4 shows vertically striped regions to each indicate a time period during which a program Pp is carried out, the program Pp being a program executed for a task Tp as a primary fixed-cycle task, that is, a program allocated to the task Tp. FIG. 4 shows horizontally striped regions to each indicate a time period during which a program Ps is carried out, the program Ps being a program executed for a task Ts as a fixed-cycle task, that is, a program allocated to the task Ts. FIG. 4 shows a region with two or more mutually crossing oblique lines to indicate a time period during which Subscription SubX is carried out, that is, the variables A to C are Read together.

In the example illustrated in FIG. 4, the task Tp is carried out over a cycle of 1 ms, and the task Ts is carried out over a cycle of 2 ms. FIG. 4 shows a program Pp1 to particularly indicate a program Pp carried out during a time period from (i) a time point (t=0) at which the control section 130 (in particular, the arithmetic section 131) starts a control process to (ii) a time point at which the first cycle of the task Tp ends (that is, a time period from a start time point t=0 to an end time point t=1 ms). FIG. 4 similarly shows a program Pp2 to indicate a program Pp carried out during the second cycle of the task Tp (that is, during a time period from a start time point t=1 ms to an end time point t=2 ms) and a program Pp3 to indicate a program Pp carried out during the third cycle. FIG. 4, in other words, shows a program Ppn to indicate a program Pp carried out during an n-th cycle (where n is a natural number) of the task Tp (that is, during a time period from a start time point t=n−1 ms to an end time point t=n ms).

FIG. 4 shows a program Ps1 to particularly indicate a program Ps carried out during a time period from (i) a time point (t=0) at which the control section 130 starts a control process to (ii) a time point at which the first cycle of the task Ts ends (that is, a time period from a start time point t=0 to an end time point t=2 ms). FIG. 4 similarly shows a program Ps2 to indicate a program Ps carried out during the second cycle of the task Ts (that is, during a time period from a start time point t=2 ms to an end time point t=4 ms) and a program Ps3 to indicate a program Ps carried out during the third cycle. FIG. 4, in other words, shows a program Psn to indicate a program Ps carried out during an n-th cycle (where n is a natural number) of the task Ts (that is, during a time period from a start time point t=2×(n−1) ms to an end time point t=2×n ms).

(Outline of Process of Reading Variables)

The description below outlines a process carried out by the management system 1 as illustrated in FIG. 4.

First, the client device 80 outputs, to the PLC 10, a service request to Read variables A to C together (Subscription SubX). The PLC 10 accepts the service request (SubX) from the client device 80 (Step 1).

Second, when the OPC UA input section 111 of the PLC 10 has received the service request (SubX), the reading period calculating section 114 of the PLC 10 calculates a time period for carrying out SubX, that is, a reading period (Proc: Y μs) as a time length necessary to read the variables A to C (Step 2).

The reading time point selecting section 115 selects a reading time point with reference to an expected reading period Y μs of which the reading time point selecting section 115 has been notified by the reading period calculating section 114. Specifically, the reading time point selecting section 115 of the PLC 10 selects, as a reading time point, a time point that is the expected reading period Y μs before a time point at which the respective cycles of tasks Tp and Ts start together.

In the example illustrated in FIG. 4, the task Tp is carried out over a cycle of 1 ms, and the task Ts is carried out over a cycle of 2 ms. Thus, while the control section 130 is carrying out a control process, the respective cycles of the tasks Tp and Ts start together at a time point of, for example, t=2 ms, 4 ms, 6 ms . . . . In other words, in the example illustrated in FIG. 4, the respective cycles of a plurality of tasks that the control section 130 is carrying out start together (that is, such a plurality of tasks are synchronized with each other) at a time point of, for example, t=2 ms, 4 ms, 6 ms . . . .

Thus, in the example illustrated in FIG. 4, the reading time point selecting section 115 selects, as a reading time point, a time point that is the expected reading period Y μs before t=2 ms, that is, a time point obtained by subtracting Y μs from 2 ms (that is, a time point t=2 ms−Yμs). The reading time point selecting section 115 notifies the reading section 112 of the reading time point selected.

Third, the reading section 112, at the reading time point of which the reading section 112 has been notified by the reading time point selecting section 115, that is, the time point that is the expected reading period Y μs before t=2 ms, refers to the variables table 122 of the storage section 120 and reads the respective values of the variables A to C (Read). In other words, the OPC UA server section 110 of the PLC 10 interrupts the process at a time point that is Y μs before a time point at which the respective cycles of the plurality of tasks start together and carries out SubX (Step 3).

Fourth, the OPC UA output section 113 of the PLC 10 collectively transmits, to the client device 80, the respective values of the variables A to C which respective values the reading section 112 has read. In other words, the OPC UA server section 110 of the PLC 10 returns, to the client device 80, the result of carrying out SubX (Read result) (Step 4).

The above-outlined process that the PLC 10 carries out may be stated as follows: A control method that the PLC 10 carrying out is a method for controlling a control device configured to control control-target equipment by concurrently repeating a plurality of tasks each over a corresponding cycle, the method including: an accepting step of accepting from outside a request to collectively query about respective values that a plurality of variables have while the plurality of tasks are being carried out, the plurality of variables each having a value that becomes updated for at least one of the plurality of tasks (Step 1); a reading step of, in a case where the request has been accepted during the accepting step, reading the respective values of the plurality of variables, the respective values each having been updated for the at least one of the plurality of tasks, in such a manner that reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle (Step 3); and an output step of outputting, to outside, the respective values of the plurality of variables, the respective values having been read during the reading step (Step 4).

With the above method, the control method is arranged to control control-target equipment by concurrently repeating a plurality of tasks each over a corresponding cycle. The control method is arranged to, in a case where the request has been accepted, read the respective values of the plurality of variables, the respective values each having been updated for the at least one of the plurality of tasks, in such a manner that the reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle; and to output, to outside, the respective values of the plurality of variables, the respective values having been read.

The control method thus advantageously makes it possible to (i) carry out a plurality of tasks concurrently and periodically and (ii) in a case where a request has been accepted from outside to collectively query about respective values as updated of a plurality of variables while the plurality of tasks are being carried out, return respective values as updated of a plurality of variables which respective values are in synchronization with each other.

Synchronization is not ensured of a plurality of readout values in a case where reading of the respective values as updated of the plurality of variables becomes completed at respective time points that coincide with two or more instances of the basic cycle. In other words, synchronization is not ensured of a plurality of readout values in a case where reading of the respective values as updated of the plurality of variables becomes completed at respective time points that are apart from each other by not shorter than a basic cycle.

This is clearly understood in view of, for example, a case where tasks Tp and Ts are carried out concurrently and periodically, the task Tp corresponding to the basic cycle and involving updating the value of a variable A, the task Ts corresponding to a cycle different from the basic cycle and involving updating the value of a variable C (which is different from the variable A).

Specifically, in a case where there is a time interval of not shorter than the basic cycle between (i) the time point at which reading of the value as updated of a variable A becomes completed and (ii) the time point at which reading of the value as updated of a variable C becomes completed, the task Tp will be carried out one or more times during the time interval. This will result in the user obtaining the value of the variable A and the value that the variable C has after (i) the value of the variable A has been read and (ii) the task Tp (which involves updating the value of the variable A) has subsequently been carried out one or more times. The above operation will thus fail to (i) ensure synchronization between the respective readout values of the variables A and C and (ii) allow the user to understand the relationship between the respective values as updated of a plurality of variables which respective values are in synchronization with each other. The user will, in other words, be unable to obtain the respective values of the variables A and C which respective values were updated substantially simultaneously for the respective tasks Tp and Ts (which are carried out concurrently and periodically). In the above-described example, the user obtains the value of the variable A and the value that the variable C has after (i) the value of the variable A has been read and (ii) the task Tp (which involves updating the value of the variable A) has subsequently been carried out one or more times.

In contrast, the control method is arranged to (i) read the respective values of the plurality of variables, the respective values each having been updated for the at least one of the plurality of tasks, in such a manner that reading of all the respective values of the plurality of variables becomes completed during a single instance of a cycle of a task which cycle is shortest among respective cycles of the plurality of tasks and (ii) output, to outside, the respective values of the plurality of variables, the respective values having been read. The control method is, in other words, arranged to (i) read the respective values as updated of the plurality of variables in such a manner as to complete reading the respective values as updated of the plurality of variables at respective time points that are apart from each other by a time interval shorter than the basic cycle and (ii) output, to outside, the respective readout values of the plurality of variables.

In the above-described example, the control method includes reading the respective values as updated of the variables A and C in such a manner as to complete reading the respective values as updated of the variables A and C at respective time points that are apart from each other by a time interval shorter than the basic cycle. The control method includes reading the respective values as updated of the variables A and C in such a manner as to not carry out either of the tasks Tp and Ts during a time period from (i) the time point at which reading of the value as updated of the variable A becomes completed and (ii) the time point at which reading of the value as updated of the variable C becomes completed.

The control method thus allows the user to obtain a value as updated of each of a plurality of variables that have been updated substantially simultaneously for each of a plurality of tasks carried out concurrently, that is, to obtain a value as updated of each of a plurality of variables with ensured synchronization. In other words, in a case where the PLC 10 has been collectively queried about respective values as updated of a plurality of variables while the PLC 10 is carrying out tasks, synchronization is ensured by the control method of respective values as updated of the plurality of variables which respective values are returned as a response.

In the above-described example, the control method allows the user to obtain (i) the value of the variable A which value has been updated for the task Tp and (ii) the value of the variable C which value has been updated for the task Ts substantially simultaneously with the update of the variable A. In other words, the control method allows the user to obtain respective values as updated of variables A and C synchronization of which respective values is ensured.

(Details of Process of Reading Variables)

The description below deals with further details of FIG. 4. In FIG. 4, the control section 130 (in particular, the arithmetic section 131) simultaneously starts the respective carrying-out cycles of tasks Tp and Ts at a time point t=0, that is, at a time point of the start of a control process.

Specifically, the arithmetic section 131 first starts at the time point t=0 to carry out the task Tp, which has a priority higher than that of the task Ts. The arithmetic section 131 does not start a process for the task Ts, which has a priority lower than that of the task Tp, and puts the task Ts on standby.

The arithmetic section 131 executes a program Pp (in particular, Pp1) of the task Tp which program Pp includes a user program. When the arithmetic section 131 completes the process for the task Tp, the arithmetic section 131 starts a process for the task Ts, which has a priority following that of the task Tp. The arithmetic section 131, in other words, executes a program Ps (in particular, Ps1) of the task Ts which program Ps includes a user program. In the example illustrated in FIG. 4, the arithmetic section 131 completes the process for the task Ts by t=1 ms, that is, by the time 1 ms has elapsed after the respective carrying-out cycles of the tasks Tp and Ts started simultaneously.

Next, when 1 ms has elapsed after the respective carrying-out cycles of the tasks Tp and Ts started simultaneously (t=1 ms), since the carrying-out cycle of the task Tp has elapsed, the arithmetic section 131 starts carrying out a task Tp. In other words, the arithmetic section 131 starts carrying out a program Pp (in particular, Pp2) of the task Tp at the time point t=1 ms, thereby completing the process for the task Tp.

As described above, the reading time point selecting section 115 selects, as a reading time point, a time point that is the expected reading period Y μs before a time point at which the respective cycles of tasks Tp and Ts start together.

In the example illustrated in FIG. 4, the reading time point selecting section 115 selects, as a reading time point, a time point that is the expected reading period Y µs before the time point t=2 ms, at which the respective cycles of the tasks Tp and Ts start together. The reading section 112 reads the respective values of the variables A to C (Read) at the reading time point.

The reading section 112 thus reads the respective values of the variables A and B which respective values were updated for the task Tp (in particular, the respective values of the variables A and B which respective values were updated as the program Pp1 was executed). The reading section 112 also reads the value of the variable C which value was updated for the task Ts (in particular, the value of the variable C which value was updated as the program Ps1 was executed). In particular, the reading section 112 reads the respective values of the variables A to C during a time period from (i) a time point at which execution of each program that involves updating the respective values of the variables A to C becomes completed to (ii) a time point at which each task starts subsequently which includes a program that involves updating the respective values of the variables A to C. Specifically, the reading section 112 reads the respective values of the variables A to C during a time period from (i) a time point at which execution of each of the programs Pp and Ps, which involves updating the respective values of the variables A to C, becomes completed to (ii) a time point at which each of the tasks Tp and Ts subsequently starts, which include programs Pp and Ps, respectively.

None of the respective values of the variables A to C is updated for the task Tp or Ts between (i) the time point at which the reading section 112 completes reading the respective values of the variables A and B and (ii) the time point at which the reading section 112 completes reading the value of the variable C. In other words, the reading section 112 reads the respective values as updated of the variables A to C which respective values are in synchronization with each other.

Embodiment 2

The description below deals with another embodiment of the present invention. For convenience of description, any member of the present invention that is identical in function to a member described for Embodiment 1 is assigned the same reference sign, and is not described again here.

Figure 5:
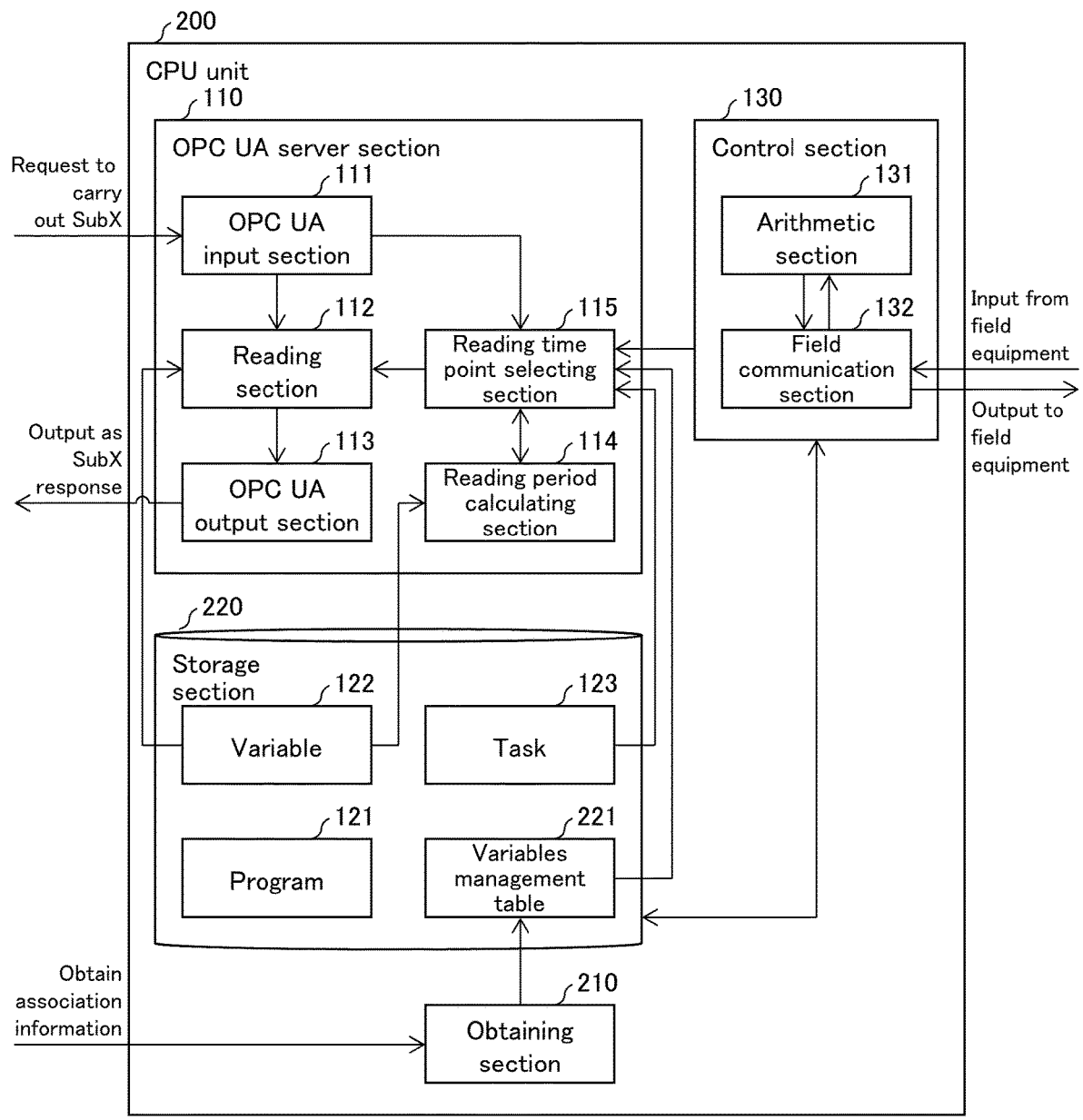
FIG. 5 is a block diagram illustrating, for example, the configuration of a main part of a CPU unit in accordance with Embodiment 2 of the present invention.

FIG. 5 is a block diagram illustrating, for example, the configuration of a main part of a CPU unit 200 of a PLC 11 in accordance with Embodiment 2 of the present invention. The CPU unit 200 of the present embodiment is similar to the above-described CPU unit 100 of Embodiment 1 except that the CPU unit 200 further includes an obtaining section 210 as a functional block and that the CPU unit 200 includes a storage section 220 that stores a variables management table 221. Since the CPU unit 200 is similar in configuration to the above-described CPU unit 100 except that the CPU unit 200 further includes an obtaining section 210 and that the CPU unit 200 includes a storage section 220 that stores a variables management table 221, the description below deals mainly with the obtaining section 210 and the variables management table 221.

(Outline of Control Device)

The description below first outlines the PLC 11 to facilitate understanding of the PLC 11. Specifically, the PLC 11 selects a time point at which to read the respective values as updated of a plurality of variables (for example, variables A to C) with use of information on a task for which the value of each of the plurality of variables as readout targets is updated (that is, association information).

More specifically, the PLC 11 further includes an obtaining section 210 configured to obtain association information, which associates each of the plurality of variables with the at least one of the plurality of tasks, wherein the reading section 112, with reference to the association information that the obtaining section 210 has obtained, reads the respective values of the plurality of variables during a cycle of the at least one of the plurality of tasks.

With the above arrangement, the PLC 11 is configured to obtain association information, which associates each of the plurality of variables with the at least one of the plurality of tasks, wherein the PLC 11, with reference to the association information that has been obtained, reads the respective values of the plurality of variables during a cycle of the at least one of the plurality of tasks.

Thus, the PLC 11, with reference to the association information, advantageously reads the respective values of the plurality of variables during a cycle of the at least one of the plurality of tasks.

The PLC 11 may be arranged such that in a case where the association information associates a certain one of the plurality of variables (for example, variable C) with two or more of the plurality of tasks for which two or more of the plurality of tasks a value of the certain one of the plurality of variables becomes updated, the reading section 112 completes reading the value of the certain one of the plurality of variables immediately before respective cycles of the two or more of the plurality of tasks start together.

With the above arrangement, the PLC 11 is configured to, in a case where the association information associates a certain one of the plurality of variables with two or more of the plurality of tasks for which two or more of the plurality of tasks a value of the certain one of the plurality of variables becomes updated, complete reading the value of the certain one of the plurality of variables immediately before respective cycles of the two or more of the plurality of tasks start together.

In a case where the value as updated of a certain variable has been read for that one of the two or more tasks (for which the value of the certain variable becomes updated) which has the shortest cycle the value having been read becomes updated further for a task other than the task with the shortest cycle before the task with the shortest cycle is carried out again.

In contrast, the PLC 11 reads the value of the certain one of the plurality of variables by the time the respective cycles of the two or more of the plurality of tasks start together. The PLC 11 is thus advantageously capable of preventing the following situation: After the value of a certain variable which value was updated for a certain task was read, the value of the certain variable becomes updated for a task other than the certain task before the certain task is carried out again.

(Details of Control Device)

The obtaining section 210 is configured to obtain from, for example, the support device 60 association information, that is, information on how each of a plurality of variables is associated with a task that involves updating the value of the variable. The obtaining section 210 is configured to store the obtained association information in the variables management table 221 of the storage section 220.

For instance, when the support device 60 compiles or builds a control program created by the user and thereby creates an executable file, the support device 60 generates association information and outputs the generated association information to the obtaining section 210. The support device 60 generates association information by determining (i) what control program updates the value of each of a plurality of variables which value is to be updated by a control program such as a user program and (ii) what task the control program is allocated to.

The reading time point selecting section 115 uses association information in the variables management table 221 to select, as a time point at which the reading section 112 reads the respective values as updated of variables A to C, a time point that is within the cycle of each of the tasks Tp and Ts, which involve updating the respective values of the variables A to C. The reading time point selecting section 115 notifies the reading section 112 of the selected time point at which to read the respective values as updated of the variables A to C.

The reading section 112 reads the respective values as updated of the variables A to C at the time point at which to read the respective values as updated of the variables A to C of which time point the reading section 112 has been notified by the reading time point selecting section 115.

FIG. 6 provides diagrams each illustrating a data structure of the variables management table 221 stored in the storage section 220 of the CPU unit 200. The variables management table 221 stores association information provided by the obtaining section 210. The variables management table 221 stores, for example, association information that the obtaining section 210 has obtained from the support device 60. Association information indicates a task that involves updating the value of each of a plurality of variables stored in the variables table 122. Association information is, for example, information on what task includes executing a user program that Writes each of variables A, B, and C (that is, user variables A, B, and C) (that is, what task updates the value). Association information may further indicate the data type of each of a plurality of variables stored in the variables table 122.

The association information illustrated in (A) of FIG. 6 as an example indicates that the variable A is updated for a task Tp as a primary fixed-cycle task and that the data type of the variable A is Int. The association information illustrated in (A) of FIG. 6 as an example indicates that the variable B is updated for a task Tp as a primary fixed-cycle task and that the data type of the variable B is Int. The association information illustrated in (A) of FIG. 6 as an example indicates that the variable C is updated for a task Ts as a fixed-cycle task and that the data type of the variable C is Long.

The value of a variable is not necessarily updated for one task only: The value of a variable may be updated for a plurality of tasks.

For instance, the association information illustrated in (B) of FIG. 6 as an example is similar to that illustrated in (A) of FIG. 6 as an example about the variables A and B, but indicates that the variable C is updated for a plurality of tasks (that is, the value of the variable C is updated for two or more tasks). In other words, the association information illustrated in (B) of FIG. 6 as an example indicates that the variable C is updated for a task Tp as a primary fixed-cycle task and a task Ts as a fixed-cycle task and that the data type of the variable C is Long.

Association information may indicate "Unknown" for a plurality of tasks (task names) for which the value of a variable is updated. The association information illustrated in (C) of FIG. 6 as an example shows "Unknown" in the "TASK" (task name) column in association with the variable C. This indicates that the value of the variable C is updated for a plurality of tasks.

The obtaining section 210 is an example "obtaining section" of the present invention. The association information stored in the variables management table 221 is example "association information" of the present invention.

(Processes Carried Out by Control Device)
(1. Case in which the Respective Values of Variables are each Updated for a Single Task)

Figure 7:
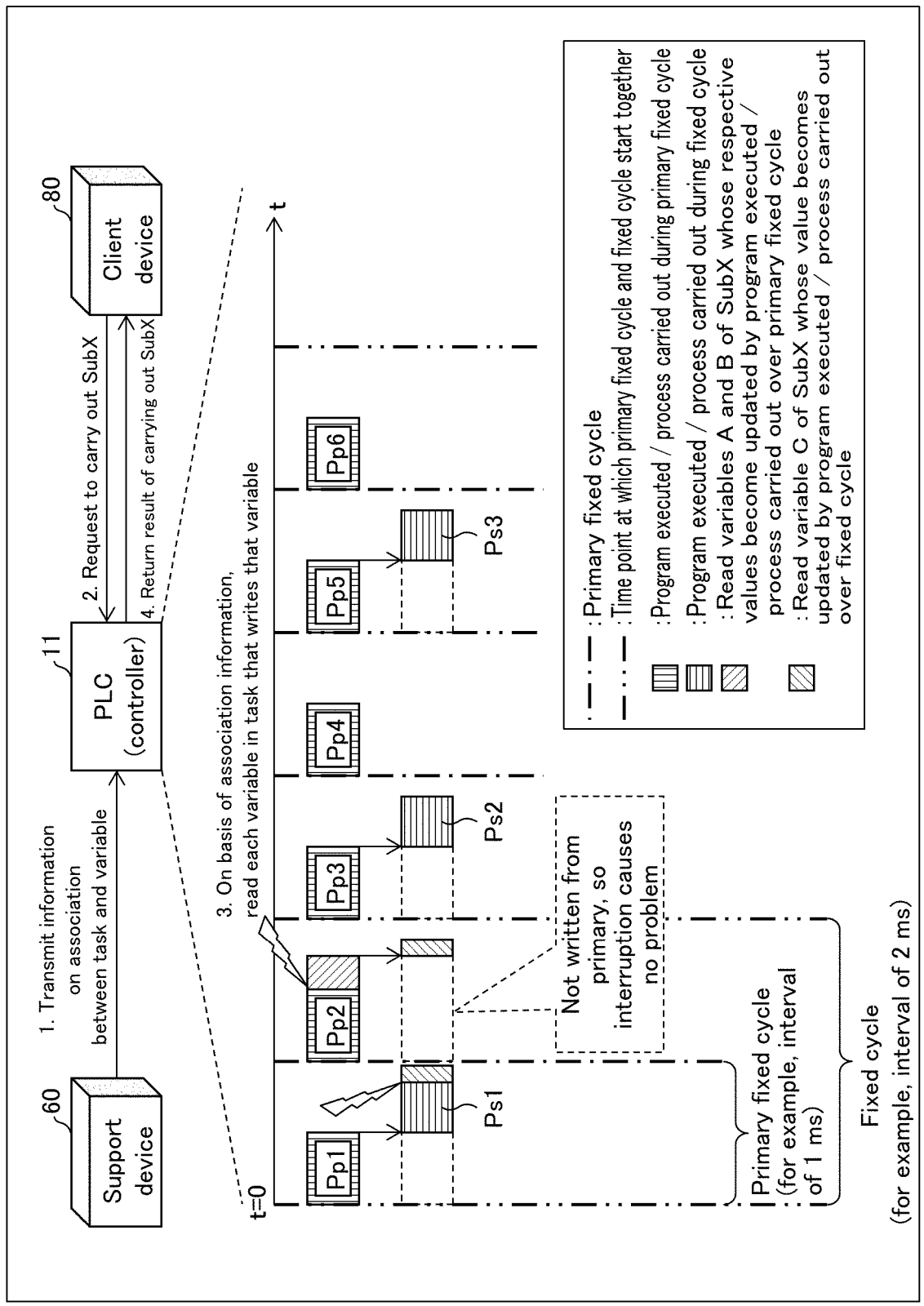
FIG. 7 is a diagram that outlines a process that the CPU unit of FIG. 5 carries out.

FIG. 7 is a diagram that outlines a process that the PLC 11 (in particular, the CPU unit 200) carries out. In the example illustrated in FIG. 7, the storage section 220 of the PLC 11 (CPU unit 200) stores in the variables management table 221 the association information illustrated in (A) of FIG. 6 as an example. In other words, in the example illustrated in FIG. 7, the variables A and B are each updated for a task Tp as a primary fixed-cycle task, whereas the variable C is updated for a task Ts as a fixed-cycle task.

(Representation in Drawing)

That portion of the representation in FIG. 7 which is similar to a corresponding portion of the representation in FIG. 4 is not described here. FIG. 7 shows a region with oblique lines extending from upper left to lower right of the drawing to indicate a time period during which Read of the variables A and B is carried out which variables A and B have respective values that are updated by a program Pp to be executed for a task Tp as a primary fixed-cycle task. FIG. 7 shows a region with oblique lines extending from upper right to lower left of the drawing to indicate a time period during which Read of the variable C is carried out which variable C has a value that is updated by a program Ps to be executed for a task Ts as a fixed-cycle task.

In FIG. 7, the task Tp is carried out preferentially over the task Ts and over a cycle of, for example, 1 ms. The task Ts is prioritized less than the task Tp, and is carried out over a cycle of, for example, 2 ms.

(Outline of Process of Reading Variables)

The description below outlines the process that the PLC 11 carries out as illustrated in FIG. 7 as an example.

First, the support device 60 notifies the PLC 11 of association information, that is, information on association between tasks and variables. As described above, in the example illustrated in FIG. 7, the support device 60 notifies the PLC 11 of association information indicating that the variables A and B are each updated for a task Tp as a primary fixed-cycle task, whereas the variable C is updated for a task Ts as a fixed-cycle task. The obtaining section 210 stores the association information in the variables management table 221 of the storage section 220.

Second, the client device 80 outputs, to the PLC 10, a service request to Read variables A to C together (Subscription SubX).

Third, when the OPC UA input section 111 of the PLC 11 has received the service request (SubX), the PLC 11, on the basis of the association information stored in the variables management table 221, Reads the variables A to C for respective tasks for which the variables A to C are Written.

Specifically, the reading time point selecting section 115 selects a time point as below at which the reading section 112 Reads each of the variables A to C.

(1) The reading time point selecting section 115 selects a time point as below at which the reading section 112 Reads each of the variables A and B, which have respective values that are updated for the task Tp. Specifically, the reading time point selecting section 115 selects, as a time point at which the reading section 112 Reads each of the variables A and B, a time point that is within the cycle of the task Tp and that is after completion of execution of the program Pp. The reading time point selecting section 115, in other words, selects a time point within the cycle of the task Tp as a time point at which to read the respective values as updated of the variables A and B.

(2) The reading time point selecting section 115 selects a time point as below at which the reading section 112 Reads the variable C, which has a value that is updated for the task Ts. Specifically, the reading time point selecting section 115 selects, as a time point at which the reading section 112 Reads the variable C, a time point that is within the cycle of the task Ts and that is after completion of execution of the program Ps. The reading time point selecting section 115, in other words, selects a time point within the cycle of the task Ts as a time point at which to read the value as updated of the variable C.

The reading time point selecting section 115 selects a reading time point in such a manner that respective time points at which the reading section 112 completes reading of the respective values of the variables A to C fall between (i) a time point at which a single cycle of a task Tp (which has a cycle that is the shortest among the respective cycles of a plurality of tasks that the control section 130 carries out) starts and (ii) a time point at which the cycle ends. For instance, the reading time point selecting section 115 selects a time point of reading each of the variables A to C in such a manner that neither of the respective values of the variables A and B is updated during a time period from (i) a time point at which reading of the respective values as updated of the variables A and B becomes completed to (ii) a time point at which reading of the value as updated of the variable C becomes completed. In other words, the reading time point selecting section 115 selects a time point of reading each of the respective values as updated of the variables A to C in such a manner that synchronization is ensured of the respective readout values as updated of the variables A to C.

In FIG. 7, the reading time point selecting section 115 selects as below a time point of reading the respective values as updated of the variables A to C. In FIG. 7, the control section 130 (in particular, the arithmetic section 131) simultaneously starts the respective carrying-out cycles of tasks Tp and Ts at a time point t=0, that is, at a time point of the start of a control process. Specifically, the arithmetic section 131 first starts at the time point t=0 to carry out the task Tp, which has a priority higher than that of the task Ts. The arithmetic section 131 does not start a process for the task Ts, which has a priority lower than that of the task Tp, and puts the task Ts on standby. The arithmetic section 131 executes a program Pp (in particular, Pp1) of the task Tp which program Pp includes a user program. When the arithmetic section 131 completes the process for the task Tp, the arithmetic section 131 starts a process for the task Ts, which has a priority following that of the task Tp. The arithmetic section 131, in other words, executes a program Ps (in particular, Ps1) of the task Ts which program Ps includes a user program. In the example illustrated in FIG. 7, the arithmetic section 131 completes the process for the task Ts by t=1 ms, that is, by the time 1 ms has elapsed after the respective carrying-out cycles of the tasks Tp and Ts started simultaneously.

The reading time point selecting section 115 selects, as a time point of reading the variable C whose value is updated for the task Ts, a time point that is within the cycle of the task Ts (that is, T=0 ms to 2 ms) and that is after completion of execution of the program Ps (for example, the program Ps1). The reading section 112, at the reading time point selected by the reading time point selecting section 115, refers to the variables table 122 of the storage section 120 and starts to read the value of the variable C (Read) (in FIG. 7, the start of the region with oblique lines extending from upper right to lower left of the drawing).

If the time point t=1 ms is reached while the reading section 112 is reading the variable C, since the carrying-out cycle of the task Tp has elapsed, the arithmetic section 131 starts carrying out the task Tp at the time point t=1 ms. In other words, at the time point t=1 ms, the arithmetic section 131 interrupts the reading (Read) of the variable C by the reading section 112, starts executing a program Pp (in particular, Pp2) of a task Tp, and completes the process for the task Tp. In other words, if the time point t=1 ms is reached while the reading section 112 is reading the variable C, the reading section 112 completes the reading (Read) of the variable C at a time point between t=1 ms and t=2 ms at the earliest.

The reading time point selecting section 115 selects a time point of reading the value of each of the variables A and B in such a manner that the time interval is shorter than a single cycle of the task Tp (that is, 1 ms) between (i) the time point at which the reading of the value of each of the variables A and B becomes completed and (ii) the time point at which the reading of the variable C becomes completed. Specifically, the reading time point selecting section 115 selects, as a time point of reading the value of each of the variables A and B which value is updated for the task Tp, a time point that is within the cycle of the task Tp (in the example illustrated in FIG. 7, t=1 ms to 2 ms) and that is after completion of execution of the program Ps2. In other words, the reading section 112 reads the respective values as updated of the variables A and B during the time period shown in FIG. 7 as a region with oblique lines extending from upper left to lower right of the drawing.

During a time period from (i) the time point at which the reading section 112 interrupts the reading of the variable C to (ii) a time point at which the reading section 112 resumes reading the variable C, the arithmetic section 131 does not carry out a task Ts (in particular, a program Ps) that involves updating the value of the variable C. A task Ts (in particular, a program Ps) thus does not update the value of the variable C while the reading section 112 is reading the variable C.

As described above, in FIG. 7, the reading section 112 reads (1) the respective values of the variables A and B which respective values have been updated by the program Pp2 and (2) the value of the variable C which value has been updated by the program Ps1. The time interval is shorter than a single cycle of the task Tp between (i) the time point at which the reading of the value of each of the variables A and B becomes completed and (ii) the time point at which the reading of the variable C becomes completed. The arithmetic section 131 thus does not carry out a task Tp during that time interval. In other words, synchronization is ensured of the respective readout values as updated of the variables A to C.

Fourth, the OPC UA output section 113 of the PLC 11 collectively transmits, to the client device 80, the respective values of the variables A to C which respective values the reading section 112 has read. In other words, the OPC UA server section 110 of the PLC 11 returns, to the client device 80, the result of carrying out SubX (Read result).

In the example illustrated in FIG. 7, the reading section 112 completes the reading of the variable C at a time point between t=1 ms and t=2 ms. The reading section 112 thus reads the value of each of the variables A and B at a time point that is within the cycle of the task Tp (specifically, t=1 ms to 2 ms) and that is after completion of execution of the program Ps2. In a case where the reading section 112 completes the reading of the variable C by the time point t=1 ms, the reading section 112 reads the value of each of the variables A and B at a time point that is within the cycle of the task Tp (specifically, t=0 ms to 1 ms) and that is after completion of execution of the program Ps1.

Specifically, the reading time point selecting section 115 selects a time point of reading each of a plurality of variables P and Q (which are a target of a reading process) in such a manner that the respective values of the variables P and Q are not updated during a time period from (i) a time point at which reading of the value of the variable P (which is one of the variables P and Q) becomes completed to (ii) a time point at which reading of the value of the variable Q (which is another one of the variables P and Q) becomes completed. In other words, the reading time point selecting section 115 selects a time point of reading each of a plurality of variables P and Q in such a manner that no task (in particular, program) that involves updating the value of the variable P or Q is carried out during a time period from (i) a time point at which reading of the value of the variable P becomes completed to (ii) a time point at which reading of the value of the variable Q becomes completed.

(Details of Process of Reading Variables)

Figure 8:
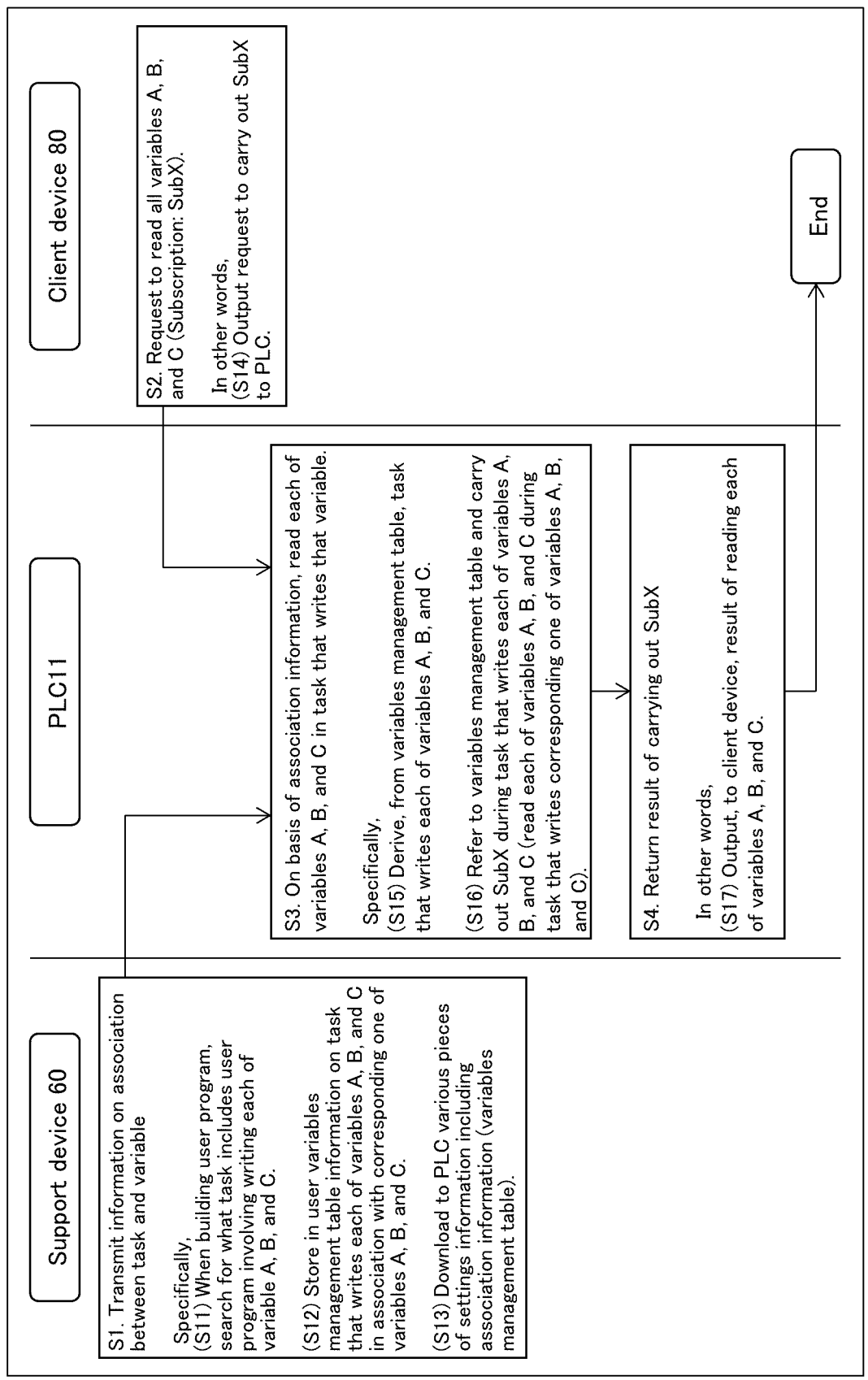
FIG. 8 is a diagram that details the process illustrated in FIG. 7.

FIG. 8 is a diagram that details the process illustrated in FIG. 7.

The support device 60 notifies the PLC 11 in advance of association information, that is, information on association between tasks and variables (S1). Specifically, at the time of building a control program such as a user program, the support device 60 does a search for what task includes a control program that Writes (that is, updates the value of) each of the variables A to C (S11). The support device 60 generates association information and, for instance, stores, in the user variables management table, information on a task that Writes each of the variables A to C, in association with the corresponding one of the variables A to C (S12). The support device 60 downloads (that is, outputs) various pieces of settings information including association information (for example, a variables management table) to the PLC 11 (S13).

Next, the client device 80 outputs, to the PLC 11, a service request to Read variables A to C together (Subscription SubX) (S2). Specifically, the client device 80 outputs, to the PLC 11, a request to carry out SubX (S14).

When the OPC UA input section 111 of the PLC 11 has received the service request (SubX), the reading section 112, on the basis of the association information obtained from the support device 60 in S1, Reads the value of each of the variables A to C during a task involving Writing each variable (S3).

Specifically, the reading time point selecting section 115 derives, from the variables management table 221, a task that Writes each of the variables A to C (S15). In other words, the reading time point selecting section 115, on the basis of association information stored in the variables management table 221, obtains information on a task that Writes each of the variables A to C, in other words, determines what task involves updating the value of each of the variables A to C.

The OPC UA server section 110 refers to the variables management table 221 and carries out SubX during a task that Writes each of the variables A to C, that is, Reads each of the variables A to C during a task that Writes the corresponding one of the variables A to C (S16). In other words, the reading time point selecting section 115 first uses association information in the variables management table 221 to select, as a time point at which the reading section 112 reads the respective values as updated of variables A to C, as a time point within the cycle of each of tasks Tp and Ts, which involve updating the respective values of the variables A to C. The reading section 112 then reads the respective values as updated of the variables A to C at the time point at which to read the respective values as updated of the variables A to C which time point the reading time point selecting section 115 has selected. The description above has already dealt, with reference to FIG. 7, with how the reading time point selecting section 115 selects a time point of reading the respective values as updated of the variables A to C. The description here does not deal with it in detail.

Finally, the OPC UA output section 113 of the PLC 11 returns, to the client device 80, the result of carrying out SubX (S4). Specifically, the OPC UA output section 113 outputs, to the client device 80, the result of Reading each of the variables A to C (S17).

(2. Case in which the Respective Values of Variables are each Updated for Two or more Tasks)

Figure 9:
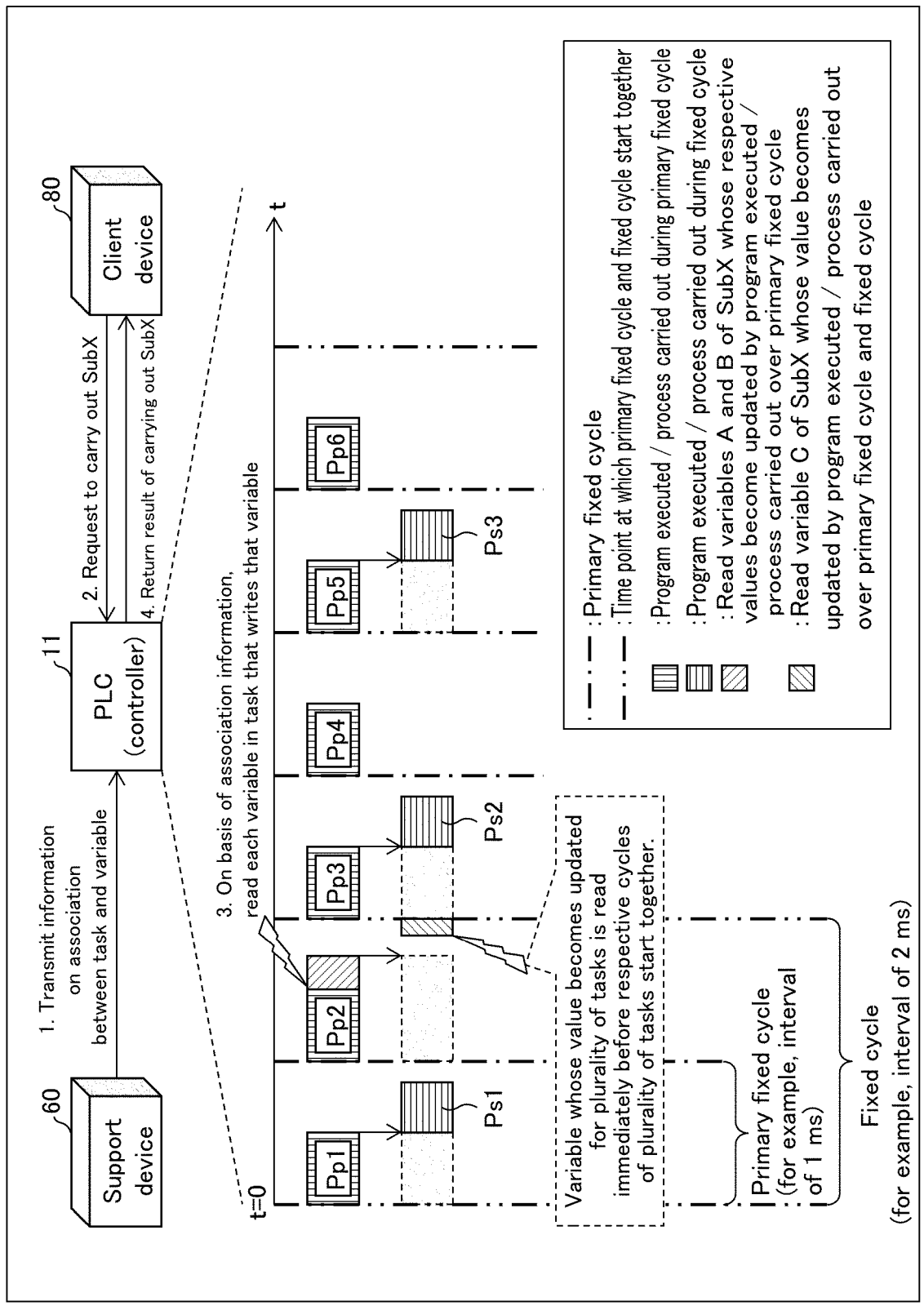
FIG. 9 is a diagram that outlines a process that the CPU unit of FIG. 5 carries out in which process the value of a variable is updated during each of a plurality of tasks.

FIG. 9 is a diagram that outlines a process that the PLC 11 (in particular, the CPU unit 200) carries out in which process the value of a variable is updated during each of a plurality of tasks. In the example illustrated in FIG. 9, the storage section 220 of the PLC 11 (CPU unit 200) stores in the variables management table 221 the association information illustrated in (C) of FIG. 6 as an example. In other words, in the example illustrated in FIG. 7, the variables A and B are each updated for a task Tp as a primary fixed-cycle task, whereas the variable C is updated for a task Tp as a primary fixed-cycle task and a task Ts as a fixed-cycle task.

(Representation in Drawing)

That portion of the representation in FIG. 9 which is similar to a corresponding portion of the representation in FIG. 4 or 7 is not described here. In FIG. 9, the task Tp is carried out preferentially over the task Ts and over a cycle of, for example, 1 ms. The task Ts is prioritized less than the task Tp, and is carried out over a cycle of, for example, 2 ms.

(Outline of Process of Reading Variables)

The description below outlines the process that the PLC 11 carries out as illustrated in FIG. 9 as an example.

First, the support device 60 notifies the PLC 11 of association information, that is, information on association between tasks and variables. As described above, in the example illustrated in FIG. 9, the support device 60 notifies the PLC 11 of association information indicating that the variables A and B are each updated for a task Tp, whereas the variable C is updated for tasks Tp and Ts. The obtaining section 210 stores the association information in the variables management table 221 of the storage section 220.

Second, the client device 80 outputs, to the PLC 10, a service request to Read variables A to C together (Subscription SubX).

Third, when the OPC UA input section 111 of the PLC 11 has received the service request (SubX), the PLC 11, on the basis of the association information stored in the variables management table 221, Reads the variables A to C for respective tasks for which the variables A to C are Written.

Specifically, the reading time point selecting section 115 selects a time point as below at which the reading section 112 Reads each of the variables A to C.

(1) The reading time point selecting section 115 selects a time point as below at which the reading section 112 Reads each of the variables A and B, which have respective values that are updated for the task Tp. Specifically, the reading time point selecting section 115 selects, as a time point at which the reading section 112 Reads each of the variables A and B, a time point that is within the cycle of the task Tp and that is after completion of execution of the program Pp. The reading time point selecting section 115, in other words, selects a time point within the cycle of the task Tp as a time point at which to read the respective values as updated of the variables A and B.

(2) The reading time point selecting section 115 selects a time point as below at which the reading section 112 Reads the variable C, which has a value that is updated for the tasks Tp and Ts. In other words, the reading time point selecting section 115 selects, as a time point at which the reading section 112 Reads the variable C, a time point immediately before a time point at which the respective cycles of the tasks Tp and Ts start together.

In the example illustrated in FIG. 9, the task Tp is carried out over a cycle of 1 ms, and the task Ts is carried out over a cycle of 2 ms. Thus, while the control section 130 is carrying out a control process, the respective cycles of the tasks Tp and Ts start together at a time point of, for example, t=2 ms, 4 ms, 6 ms . . . . In other words, in the example illustrated in FIG. 9, the respective cycles of a plurality of tasks that the control section 130 is carrying out start together (that is, such a plurality of tasks are synchronized with each other) at a time point of, for example, t=2 ms, 4 ms, 6 ms . . . . Thus, in the example illustrated in FIG. 9, the reading time point selecting section 115 selects, as a time point at which the reading section 112 Reads the variable C, a time point immediately before the time point t=2 ms, that is, a time point at which the respective cycles of the tasks Tp and Ts start together.

In FIG. 9, the control section 130 (in particular, the arithmetic section 131) simultaneously starts the respective carrying-out cycles of tasks Tp and Ts at a time point t=0, that is, at a time point of the start of a control process. Specifically, the arithmetic section 131 first starts at the time point t=0 to carry out the task Tp, which has a priority higher than that of the task Ts. The arithmetic section 131 does not start a process for the task Ts, which has a priority lower than that of the task Tp, and puts the task Ts on standby. The arithmetic section 131 executes a program Pp (in particular, Pp1) of the task Tp which program Pp includes a user program. When the arithmetic section 131 completes the process for the task Tp, the arithmetic section 131 starts a process for the task Ts, which has a priority following that of the task Tp. The arithmetic section 131, in other words, executes a program Ps (in particular, Ps1) of the task Ts which program Ps includes a user program. In the example illustrated in FIG. 9, the arithmetic section 131 completes the process for the task Ts by t=1 ms, that is, by the time 1 ms has elapsed after the respective carrying-out cycles of the tasks Tp and Ts started simultaneously.

The reading time point selecting section 115 selects, as a time point of reading the variable C, whose value is updated for the tasks Tp and Ts, a time point immediately before the time point t=2 ms, which is a time point at which the respective cycles of the tasks Tp and Ts start together. Specifically, the reading time point selecting section 115 obtains from the reading period calculating section 114 an expected reading period Yc, which is a time period necessary for the reading section 112 to carry out a process of reading the value of the variable C. The reading time point selecting section 115 then selects a time point of reading the value of the variable C by subtracting an expected reading period Yc from t=2 ms, which is a time point at which the respective cycles of the tasks Tp and Ts start together. The reading section 112, at the reading time point selected by the reading time point selecting section 115, refers to the variables table 122 of the storage section 120 and starts to read the value of the variable C (Read) (in FIG. 9, the start of the region with oblique lines extending from upper right to lower left of the drawing).

The reading time point selecting section 115 selects a time point of reading the value of each of the variables A and B in such a manner that the time interval is shorter than a single cycle of the task Tp (that is, 1 ms) between (i) the time point at which the reading of the value of each of the variables A and B becomes completed and (ii) the time point at which the reading of the variable C becomes completed. Specifically, the reading time point selecting section 115 selects, as a time point of reading the value of each of the variables A and B, a time point that is within the cycle of the task Tp (in the example illustrated in FIG. 9, t=1 ms to 2 ms) and that is after completion of execution of the program Ps2. In other words, the reading section 112 reads the respective values as updated of the variables A and B during the time period shown in FIG. 9 as a region with oblique lines extending from upper left to lower right of the drawing.

Since the value of the variable C is updated for the tasks Tp and Ts, the value of the variable C is updated as the result of execution of the program Pp2 in FIG. 9.

As described above, in FIG. 9, the reading section 112 reads (1) the respective values of the variables A and B which respective values have been updated by the program Pp2 and (2) the value of the variable C which value has been updated by the program Ps2. The time interval is shorter than a single cycle of the task Tp between (i) the time point at which the reading of the value of each of the variables A and B becomes completed and (ii) the time point at which the reading of the variable C becomes completed. The arithmetic section 131 thus does not carry out a task Tp during that time interval. In other words, synchronization is ensured of the respective readout values as updated of the variables A to C.

Fourth, the OPC UA output section 113 of the PLC 11 collectively transmits, to the client device 80, the respective values of the variables A to C which respective values the reading section 112 has read. In other words, the OPC UA server section 110 of the PLC 11 returns, to the client device 80, the result of carrying out SubX (Read result).

Specifically, the reading time point selecting section 115 selects a time point of reading each of a plurality of variables P and Q (which are a target of a reading process) in such a manner that the respective values of the variables P and Q are not updated during a time period from (i) a time point at which reading of the value of the variable P (which is one of the variables P and Q) becomes completed to (ii) a time point at which reading of the value of the variable Q (which is another one of the variables P and Q) becomes completed. In other words, the reading time point selecting section 115 selects a time point of reading each of a plurality of variables P and Q in such a manner that no task (in particular, program) that involves updating the value of the variable P or Q is carried out during a time period from (i) a time point at which reading of the value of the variable P becomes completed to (ii) a time point at which reading of the value of the variable Q becomes completed.

(Details of Process of Reading Variables)

Figure 10:
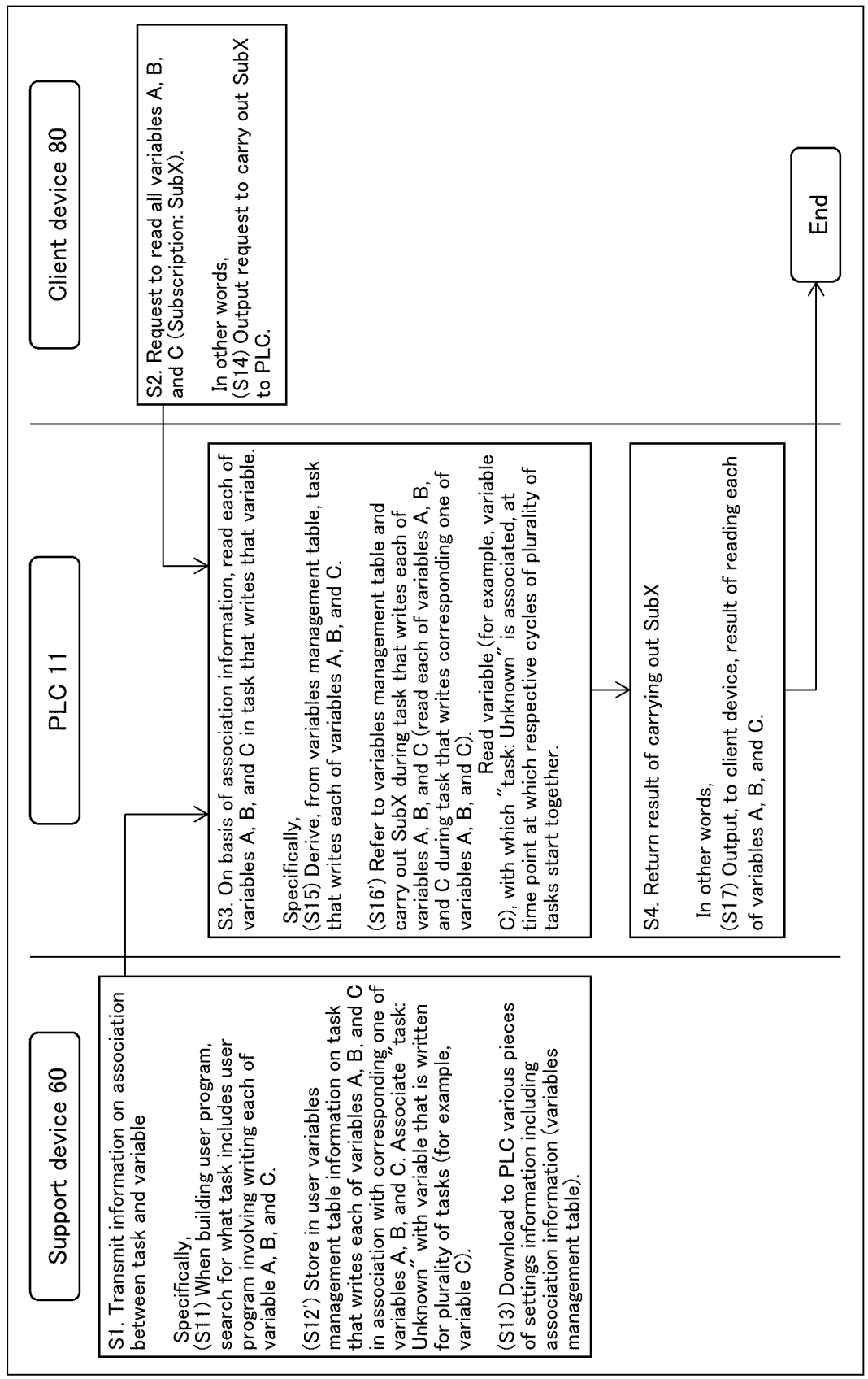
FIG. 10 is a diagram that details the process illustrated in FIG. 9.

FIG. 10 is a diagram that details the process illustrated in FIG. 9.

Similarly to the example illustrated in FIG. 8, the support device 60 notifies the PLC 11 in advance of association information, that is, information on association between tasks and variables (S1). Specifically, at the time of building a control program such as a user program, the support device

60 does a search for what task includes a control program that Writes (that is, updates the value of) each of the variables A to C (S11). The support device 60 generates association information and, for instance, stores, in the user variables management table, information on a task that Writes each of the variables A to C, in association with the corresponding one of the variables A to C. The support device 60 associates "task: Unknown" with a variable (for example, the variable C) that is Written for a plurality of tasks (for example, tasks Tp and Ts) (S12'). The support device 60 downloads (that is, outputs) various pieces of settings information including association information (for example, a variables management table) to the PLC 11 (S13).

Next, the client device 80 outputs, to the PLC 11, a service request to Read variables A to C together (Subscription SubX) (S2). Specifically, the client device 80 outputs, to the PLC 11, a request to carry out SubX (S14).

When the OPC UA input section 111 of the PLC 11 has received the service request (SubX), the reading section 112, on the basis of the association information obtained from the support device 60 in S1, Reads the value of each of the variables A to C during a task involving Writing each variable (S3).

Specifically, the reading time point selecting section 115 derives, from the variables management table 221, a task that Writes each of the variables A to C (S15). In other words, the reading time point selecting section 115, on the basis of association information stored in the variables management table 221, obtains information on a task that Writes each of the variables A to C, in other words, determines what task involves updating the value of each of the variables A to C.

The OPC UA server section 110 refers to the variables management table 221 and carries out SubX during a task that Writes each of the variables A to C, that is, Reads each of the variables A to C during a task that Writes the corresponding one of the variables A to C. The OPC UA server section 110 Reads the variable C, with which "task: Unknown" is associated, at a time point at which the respective cycles of the plurality of tasks start together (S16').

In other words, in a case where the reading time point selecting section 115 has determined with use of association information stored in the variables management table 221 that the value of the variable C is updated for the tasks Tp and Ts, the reading time point selecting section 115 selects, as a time point of reading the variable C, whose value is updated for the tasks Tp and Ts, a time point immediately before a time point (for example, t=2 ms) at which the respective cycles of the tasks Tp and Ts start together.

The reading section 112 reads the respective values as updated of the variables A to C at the time point at which to read the respective values as updated of the variables A to C which time point the reading time point selecting section 115 has selected. The description above has already dealt with reference to FIG. 9 with how the reading time point selecting section 115 selects a time point of reading the respective values as updated of the variables A to C. The description here does not deal with it in detail.

Finally, the OPC UA output section 113 of the PLC 11 returns, to the client device 80, the result of carrying out SubX (S4). Specifically, the OPC UA output section 113 outputs, to the client device 80, the result of Reading each of the variables A to C (S17).

§ 4. Variations
(Control Device)

The embodiments described above have each dealt with a PLC 10 or 11 as a control device (controller) according to the present invention. The control device according to the present invention is, however, not limited to a PLC, and may be any of various control devices.

(Number of Control Devices)

The management system 1 illustrated in FIG. 2 as an example is configured such that a single PLC 10 is connected to a client device 80 and to input equipment and output equipment in the control system 2. The management system 1, however, does not necessarily include a single PLC 10, and may include a plurality of PLCs 10. Such a plurality of PLCs 10 in the management system 1 may be connected to one another over a field network 20 in such a manner as to be communicable with one another.

For instance, the management system 1 does not necessarily include a single PLC 10 configured to both independently carry out control for the control system 2 and accept a service request (for example, a request to carry out SubX) from a client device 80 in the information system 3. The management system 1 may alternatively include two PLCs 10A and 10B, the PLC 10A being configured to (i) accept a request to carry out SubX from a client device 80, (ii) cause the PLC 10B (which is configured to independently carry out control for the control system 2) to carry out SubX, and (iii) output to the client device 80 the result of carrying out SubX. In this case, the PLCs 10A and 10B may, for instance, be connected to each other over a field network 20 in such a manner as to be communicable with each other.

(Multi-Tasking)

The PLCs 10 and 11 are each simply required to carry out processes in a multi-tasking manner. The PLCs 10 and 11 may each be capable of not only concurrently carrying out a plurality of tasks in a time-sharing manner, but also carrying out a plurality of tasks concurrently and simultaneously. For instance, the processor 151 may include a single core and be configured to concurrently carry out a plurality of tasks in a time-sharing manner. The processor 151 may, in other words, carry out processes in a multi-tasking manner. The processor 151 may alternatively include a multi-core and be configured to carry out a plurality of tasks concurrently and simultaneously. The processor 151 may, in other words, carry out processes in a multi-tasking manner. The processor 151 can carry out a plurality of tasks concurrently and simultaneously to improve its capability to process tasks.

The PLCs 10 and 11 may each include a single core and be configured for "concurrent carrying-out", that is, configured to, when carrying out a task, carry out no other task for multi-tasking. The PLCs 10 and 11 may each include a multi-core and be configured for "parallel carrying-out", that is, configured to, when carrying out a task, carry out another task for multi-tasking. In other words, regardless of whether the PLCs 10 and 11 are each configured for concurrent carrying-out or parallel carrying-out for multi-tasking, the PLCs 10 and 11 each collectively read respective values as updated of a plurality of variables synchronization of which respective values is ensured.

[Software Implementation Example]

Functional blocks (in particular, the OPC UA server section 110, the control section 130, and the obtaining section 210) of the PLCs 10 and 11 (in particular, the CPU units 100 and 200) can be realized by a logic circuit (hardware) provided in an integrated circuit (IC chip) or the like can be alternatively realized by software.

In the latter case, each of the PLCs 10 and 11 includes a computer that executes instructions of a program that is software realizing the foregoing functions. The computer, for example, includes one or more processors and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

(Supplemental Notes)

A control device in accordance with an aspect of the present invention is a control device configured to control control-target equipment by concurrently repeating a plurality of tasks each over a corresponding cycle, the control device including: an accepting section configured to accept from outside a request to collectively query about respective values that a plurality of variables have while the plurality of tasks are being carried out, the plurality of variables each having a value that becomes updated for at least one of the plurality of tasks; a reading section configured to, in a case where the accepting section has accepted the request, read the respective values of the plurality of variables, the respective values each having been updated for the at least one of the plurality of tasks, in such a manner that the reading section completes reading all the respective values of the plurality of variables during a time period from (i) a time point of a start of a single instance of a cycle of a task which cycle is shortest among respective cycles of the plurality of tasks to (ii) a time point of an end of the single instance of the cycle; and an output section configured to output, to outside, the respective values of the plurality of variables, the respective values having been read by the reading section.

With the above arrangement, the control device is configured to control control-target equipment by concurrently repeating a plurality of tasks each over a corresponding cycle. The control device is configured to, in a case where the request has been accepted, read the respective values of the plurality of variables, the respective values each having been updated for the at least one of the plurality of tasks, in such a manner that the reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle; and to output, to outside, the respective values of the plurality of variables, the respective values having been read.

The control device thus advantageously makes it possible to (i) carry out a plurality of tasks concurrently and periodically and (ii) in a case where a request has been accepted from outside to collectively query about respective values as updated of a plurality of variables while the plurality of tasks are being carried out, return respective values as updated of a plurality of variables which respective values are in synchronization with each other.

Synchronization is not ensured of a plurality of readout values in a case where reading of the respective values as updated of the plurality of variables becomes completed at respective time points that coincide with two or more instances of a "cycle of a task which cycle is shortest" (hereinafter referred to as "basic cycle"). In other words, synchronization is not ensured of a plurality of readout values in a case where reading of the respective values as updated of the plurality of variables becomes completed at respective time points that are apart from each other by not shorter than a basic cycle.

This is clearly understood in view of, for example, a case where tasks Tp and Ts are carried out concurrently and periodically, the task Tp corresponding to the basic cycle and involving updating the value of a variable A, the task Ts corresponding to a cycle different from the basic cycle and involving updating the value of a variable C (which is different from the variable A).

Specifically, in a case where there is a time interval of not shorter than the basic cycle between (i) the time point at which reading of the value as updated of a variable A becomes completed and (ii) the time point at which reading of the value as updated of a variable C becomes completed, the task Tp will be carried out one or more times during the time interval. This will result in the user obtaining the value of the variable A and the value that the variable C has after (i) the value of the variable A has been read and (ii) the task Tp (which involves updating the value of the variable A) has subsequently been carried out one or more times. The above operation will thus fail to (i) ensure synchronization between the respective readout values of the variables A and C and (ii) allow the user to understand the relationship between the respective values as updated of a plurality of variables which respective values are in synchronization with each other. The user will, in other words, be unable to obtain the respective values of the variables A and C which respective values were updated substantially simultaneously for the respective tasks Tp and Ts (which are carried out concurrently and periodically). In the above-described example, the user obtains the value of the variable A and the value that the variable C has after (i) the value of the variable A has been read and (ii) the task Tp (which involves updating the value of the variable A) has subsequently been carried out one or more times.

In contrast, the control device is configured to (i) read the respective values of the plurality of variables, the respective values each having been updated for the at least one of the plurality of tasks, in such a manner that reading of all the respective values of the plurality of variables becomes completed during a single instance of a cycle of a task which cycle is shortest among respective cycles of the plurality of tasks and (ii) output, to outside, the respective values of the plurality of variables, the respective values having been read. The control device is, in other words, configured to (i) read the respective values as updated of the plurality of variables in such a manner as to complete reading the respective values as updated of the plurality of variables at respective time points that are apart from each other by a time interval shorter than the basic cycle and (ii) output, to outside, the respective readout values of the plurality of variables.

In the above-described example, the control device reads the respective values as updated of the variables A and C in such a manner as to complete reading the respective values as updated of the variables A and C at respective time points that are apart from each other by a time interval shorter than the basic cycle. The control device reads the respective values as updated of the variables A and C in such a manner as to not carry out either of the tasks Tp and Ts during a time period from (i) the time point at which reading of the value as updated of the variable A becomes completed and (ii) the time point at which reading of the value as updated of the variable C becomes completed.

The control device thus allows the user to obtain a value as updated of each of a plurality of variables that have been updated substantially simultaneously for each of a plurality of tasks carried out concurrently, that is, to obtain a value as updated of each of a plurality of variables with ensured synchronization. In other words, in a case where the control device has been collectively queried about respective values as updated of a plurality of variables while the control device is carrying out tasks, synchronization is ensured of respective values as updated of the plurality of variables which respective values the control device returns as a response.

In the above-described example, the control device allows the user to obtain (i) the value of the variable A which value has been updated for the task Tp and (ii) the value of the variable C which value has been updated for the task Ts substantially simultaneously with the update of the variable A. In other words, the control device allows the user to obtain respective values as updated of variables A and C synchronization of which respective values is ensured.

A control device in accordance with an aspect of the present invention may be arranged such that the reading section starts reading the respective values of the plurality of variables by a time point obtained by subtracting an expected reading period from a time point at which the respective cycles of the plurality of tasks start together, the expected reading period being a time period expected to be necessary to read all the respective values of the plurality of variables.

With the above arrangement, the control device starts reading the respective values of the plurality of variables by a time point obtained by subtracting an expected reading period from a time point at which the respective cycles of the plurality of tasks start together, the expected reading period being a time period expected to be necessary to read all the respective values of the plurality of variables.

The control device, in other words, reads the respective values as updated of the plurality of variables with use of (i) information on a time point at which the respective cycles of the plurality of tasks start together and (ii) information on an expected reading period, which is a time period expected to be necessary to read all the respective values of the plurality of variables. The control device, in other words, does not need to determine, in order to read the respective values as updated of the plurality of variables, which of the plurality of tasks involves updating the value of each of the plurality of variables.

The control device is thus advantageously capable of reading the respective values as updated of the plurality of variables through a process that is feasible as compared to the case of determining which of the plurality of tasks involves updating the value of each of the plurality of variables.

A control device in accordance with an aspect of the present invention may further include an obtaining section configured to obtain association information, which associates each of the plurality of variables with the at least one of the plurality of tasks, wherein the reading section, with reference to the association information that the obtaining section has obtained, reads the respective values of the plurality of variables during a cycle of the at least one of the plurality of tasks.

With the above arrangement, the control device obtains association information, which associates each of the plurality of variables with the at least one of the plurality of tasks and, with reference to the association information that has been obtained, reads the respective values of the plurality of variables during a cycle of the at least one of the plurality of tasks.

Thus, the control device, with reference to the association information, advantageously reads the respective values of the plurality of variables during a cycle of the at least one of the plurality of tasks.

A control device in accordance with an aspect of the present invention may be arranged such that in a case where the association information associates a certain one of the plurality of variables with two or more of the plurality of tasks for which two or more of the plurality of tasks a value of the certain one of the plurality of variables becomes updated, the reading section completes reading the value of the certain one of the plurality of variables immediately before respective cycles of the two or more of the plurality of tasks start together.

With the above arrangement, the control device, in a case where the association information associates a certain one of the plurality of variables with two or more of the plurality of tasks for which two or more of the plurality of tasks a value of the certain one of the plurality of variables becomes updated, completes reading the value of the certain one of the plurality of variables immediately before respective cycles of the two or more of the plurality of tasks start together.

In a case where the value as updated of a certain variable has been read for that one of the two or more tasks (for which the value of the certain variable becomes updated) which has the shortest cycle the value having been read becomes updated further for a task other than the task with the shortest cycle before the task with the shortest cycle is carried out again.

In contrast, the control device reads the value of the certain one of the plurality of variables by the time the respective cycles of the two or more of the plurality of tasks start together. The control device is thus advantageously capable of preventing the following situation: After the value of a certain variable which value was updated for a certain task was read, the value of the certain variable becomes updated for a task other than the certain task before the certain task is carried out again.

A control device in accordance with an aspect of the present invention may be arranged such that the control device has an OPC UA server function, the accepting section accepts the request from an OPC UA client device in a connection mode that conforms to an OPC UA standard, and the output section outputs the respective values of the plurality of variables to the OPC UA client device in a connection mode that conforms to an OPC UA standard.

With the above arrangement, the control device has an OPC UA server function, accepts the request from an OPC UA client device in a connection mode that conforms to an OPC UA standard, and outputs the respective values of the plurality of variables to the OPC UA client device in a connection mode that conforms to an OPC UA standard.

The control device thus advantageously accepts the request in a connection mode that conforms to an OPC UA standard (which is a machine-to-machine communication protocol for industrial applications that is independent of manufacturers and platforms and that is safe and reliable), and outputs the respective values of the plurality of variables in a connection mode that conforms to an OPC UA standard.

A control device in accordance with an aspect of the present invention may be arranged such that the plurality of tasks include a standard task and a task other than the standard task, and the task other than the standard task has a cycle with a length of an integral multiple of a length of a cycle of the standard task.

With the above arrangement, the control device is arranged such that the plurality of tasks include a standard task and a task other than the standard task, and the task other than the standard task has a cycle with a length of an integral multiple of a length of a cycle of the standard task.

The control device is thus advantageously capable of allowing the plurality of tasks to be in synchronization with each other easily, that is, allowing the respective cycles of the plurality of tasks to start together easily.

A control method in accordance with an aspect of the present invention is a method for controlling a control device configured to control control-target equipment by concurrently repeating a plurality of tasks each over a corresponding cycle, the method including: an accepting step of accepting from outside a request to collectively query about respective values that a plurality of variables have while the plurality of tasks are being carried out, the plurality of variables each having a value that becomes updated for at least one of the plurality of tasks; a reading step of, in a case where the request has been accepted during the accepting step, reading the respective values of the plurality of variables, the respective values each having been updated for the at least one of the plurality of tasks, in such a manner that reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle; and an output step of outputting, to outside, the respective values of the plurality of variables, the respective values having been read during the reading step.

With the above method, the control method is arranged to control control-target equipment by concurrently repeating a plurality of tasks each over a corresponding cycle. The control method is arranged to, in a case where the request has been accepted, read the respective values of the plurality of variables, the respective values each having been updated for the at least one of the plurality of tasks, in such a manner that the reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle; and to output, to outside, the respective values of the plurality of variables, the respective values having been read.

The control method thus advantageously makes it possible to (i) carry out a plurality of tasks concurrently and periodically and (ii) in a case where a request has been accepted from outside to collectively query about respective values as updated of a plurality of variables while the plurality of tasks are being carried out, return respective values as updated of a plurality of variables which respective values are in synchronization with each other.

Synchronization is not ensured of a plurality of readout values in a case where reading of the respective values as updated of the plurality of variables becomes completed at respective time points that coincide with two or more instances of the basic cycle. In other words, synchronization is not ensured of a plurality of readout values in a case where reading of the respective values as updated of the plurality of variables becomes completed at respective time points that are apart from each other by not shorter than a basic cycle.

This is clearly understood in view of, for example, a case where tasks Tp and Ts are carried out concurrently and periodically, the task Tp corresponding to the basic cycle and involving updating the value of a variable A, the task Ts corresponding to a cycle different from the basic cycle and involving updating the value of a variable C (which is different from the variable A).

Specifically, in a case where there is a time interval of not shorter than the basic cycle between (i) the time point at which reading of the value as updated of a variable A becomes completed and (ii) the time point at which reading of the value as updated of a variable C becomes completed, the task Tp will be carried out one or more times during the time interval. This will result in the user obtaining the value of the variable A and the value that the variable C has after (i) the value of the variable A has been read and (ii) the task Tp (which involves updating the value of the variable A) has subsequently been carried out one or more times. The above operation will thus fail to (i) ensure synchronization between the respective readout values of the variables A and C and (ii) allow the user to understand the relationship between the respective values as updated of a plurality of variables which respective values are in synchronization with each other. The user will, in other words, be unable to obtain the respective values of the variables A and C which respective values were updated substantially simultaneously for the respective tasks Tp and Ts (which are carried out concurrently and periodically). In the above-described example, the user obtains the value of the variable A and the value that the variable C has after (i) the value of the variable A has been read and (ii) the task Tp (which involves updating the value of the variable A) has subsequently been carried out one or more times.

In contrast, the control method is arranged to (i) read the respective values of the plurality of variables, the respective values each having been updated for the at least one of the plurality of tasks, in such a manner that reading of all the respective values of the plurality of variables becomes completed during a single instance of a cycle of a task which cycle is shortest among respective cycles of the plurality of tasks and (ii) output, to outside, the respective values of the plurality of variables, the respective values having been read. The control method is, in other words, arranged to (i) read the respective values as updated of the plurality of variables in such a manner as to complete reading the respective values as updated of the plurality of variables at respective time points that are apart from each other by a time interval shorter than the basic cycle and (ii) output, to outside, the respective readout values of the plurality of variables.

In the above-described example, the control method includes reading the respective values as updated of the variables A and C in such a manner as to complete reading the respective values as updated of the variables A and C at respective time points that are apart from each other by a time interval shorter than the basic cycle. The control method includes reading the respective values as updated of the variables A and C in such a manner as to not carry out either of the tasks Tp and Ts during a time period from (i) the time point at which reading of the value as updated of the variable A becomes completed and (ii) the time point at which reading of the value as updated of the variable C becomes completed.

The control method thus allows the user to obtain a value as updated of each of a plurality of variables that have been updated substantially simultaneously for each of a plurality of tasks carried out concurrently, that is, to obtain a value as updated of each of a plurality of variables with ensured synchronization. In other words, in a case where the control device has been collectively queried about respective values as updated of a plurality of variables while the control device is carrying out tasks, synchronization is ensured by the control method of respective values as updated of the plurality of variables which respective values are returned as a response.

In the above-described example, the control method allows the user to obtain (i) the value of the variable A which value has been updated for the task Tp and (ii) the value of the variable C which value has been updated for the task Ts substantially simultaneously with the update of the variable A. In other words, the control method allows the user to obtain respective values as updated of variables A and C synchronization of which respective values is ensured.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 10, 10A, 10B, 11 PLC (control device)
80 Client device (OPC UA client device)
111 OPC UA input section (accepting section)
112 Reading section
113 OPC UA output section (output section)
210 Obtaining section
Tp Task (standard task)
Ts Task (task other than the standard task)
Y µs Expected reading period
Step 1 Accepting step
Step 3 Reading step
Step 4 Outputting step

The invention claimed is:

1. A control device configured to control control-target equipment by concurrently repeating a plurality of tasks each over a corresponding cycle,
the control device comprising:
a memory configured to store an instruction; and
a processor configured to execute the instruction,
the processor being configured to perform operations comprising
accepting from an outside client device a request to collectively query about respective values that a plurality of variables have while the plurality of tasks are being carried out, the plurality of variables each having a value that becomes updated for at least one of the plurality of tasks,
upon acceptance of the request, reading the respective values of the plurality of variables by a time point obtained by subtracting an expected reading period from a time point at which respective cycles of the plurality of tasks start together, the expected reading period being a time period expected to be necessary to read all the respective values of the plurality of variables, the respective values each having been updated for the at least one of the plurality of tasks, in such a manner that the processor completes reading all the respective values of the plurality of variables during a time period from (i) a time point of a start of a single instance of a cycle of a task which cycle is shortest among the respective cycles of the plurality of tasks to (ii) a time point of an end of the single instance of the cycle, and
outputting, to the outside client device, the respective values of the plurality of variables, the respective values having been read by the processor.

2. A control device configured to control control-target equipment by concurrently repeating a plurality of tasks each over a corresponding cycle,
the control device comprising:
a memory configured to store an instruction; and
a processor configured to execute the instruction to perform operations comprising:
accepting from an outside client device a request to collectively query about respective values that a plurality of variables have while the plurality of tasks are being carried out, the plurality of variables each having a value that becomes updated for at least one of the plurality of tasks,
obtaining association information, which associates each of the plurality of variables with the at least one of the plurality of tasks,
upon accepting the request, reading the respective values of the plurality of variables during a cycle of the at least one of the plurality of tasks with reference to the association information in such a manner that the processor completes reading all the respective values of the plurality of variables during a time period from (i) a time point of a start of a single instance of a cycle of a task which cycle is shortest among the respective cycles of the plurality of tasks to (ii) a time point of an end of the single instance of the cycle, wherein, in a case where the association information associates a certain one of the plurality of variables with two or more of the plurality of tasks for which two or more of the plurality of tasks a value of the certain one of the plurality of variables becomes updated, the processor completes reading the value of the certain one of the plurality of variables immediately before respective cycles of the two or more of the plurality of tasks start together, and
outputting, to the outside client device, the respective values of the plurality of variables, the respective values having been read by the processor.

3. The control device according to claim 1, the processor is configured to execute the instruction to perform operations further comprising:
obtaining association information, which associates each of the plurality of variables with the at least one of the plurality of tasks, and
with reference to the obtained association information, reading the respective values of the plurality of variables during a cycle of the at least one of the plurality of tasks.

4. The control device according to claim 1 or 2, wherein the control device has an open platform communications unified architecture (OPC UA) server function,
the processor is configured with the instruction to perform operations further comprising
accepting the request from an OPC UA client device in a connection mode that conforms to an OPC UA standard, and outputting the respective values of the plurality of variables to the OPC UA client device in a connection mode that conforms to an OPC UA standard.

5. The control device according to claim 1 or 2, wherein the plurality of tasks include a standard task and a task other than the standard task, and
the task other than the standard task has a cycle with a length of an integral multiple of a length of a cycle of the standard task.

6. A method for controlling a control device configured to control control-target equipment by concurrently repeating a plurality of tasks each over a corresponding cycle, the method comprising:
accepting from an outside client device a request to collectively query about respective values that a plurality of variables have while the plurality of tasks are being carried out, the plurality of variables each having a value that becomes updated for at least one of the plurality of tasks;
in a case where the request has been accepted during the accepting, reading the respective values of the plurality of variables by a time point obtained by subtracting an expected reading period from a time point at which respective cycles of the plurality of tasks start together, the expected reading period being a time period expected to be necessary to read all the respective values of the plurality of variables, the respective values each having been updated for the at least one of the plurality of tasks, in such a manner that reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle; and
outputting, to the outside client device, the respective values of the plurality of variables, the respective values having been read during the reading.

7. A method for controlling a control device configured to control control-target equipment by concurrently repeating a plurality of tasks each over a corresponding cycle, the method comprising:
accepting from an outside client device a request to collectively query about respective values that a plurality of variables have while the plurality of tasks are being carried out, the plurality of variables each having a value that becomes updated for at least one of the plurality of tasks;
obtaining association information, which associates each of the plurality of variables with the at least one of the plurality of tasks,
upon acceptance of the request in the accepting, reading the respective values of the plurality of variables during a cycle of the at least one of the plurality of tasks with reference to the association information, in such a manner that reading of all the respective values of the plurality of variables becomes completed during a time period from (i) a time point of a start of a single instance of a cycle of a task which cycle is shortest among respective cycles of the plurality of tasks to (ii) a time point of an end of the single instance of the cycle, wherein, in a case where the association information associates a certain one of the plurality of variables with two or more of the plurality of tasks for which two or more of the plurality of tasks a value of the certain one of the plurality of variables becomes updated, reading of the value of the certain one of the plurality of variables becomes completed immediately before respective cycles of the two or more of the plurality of tasks start together; and
outputting, to the outside client device, the respective values of the plurality of variables, the respective values having been read during the reading.

8. A non-transitory computer-readable storage medium storing therein an information processing program for causing a computer to function as a control device according to any one of claims 1 to 3.

* * * * *